(12) United States Patent
Bergquist et al.

(10) Patent No.: US 11,039,328 B2
(45) Date of Patent: Jun. 15, 2021

(54) TECHNIQUE FOR MONITORING A RADIO LINK CONTROL (RLC)

(71) Applicant: Telefonaktiebolaget LM Ericsson (publ), Stockholm (SE)

(72) Inventors: Gunnar Bergquist, Kista (SE); Anders Jonsson, Täby (SE); Samir Shah, Ottawa (CA); Mikael Wittberg, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/713,581

(22) Filed: Dec. 13, 2019

(65) Prior Publication Data

US 2020/0128416 A1 Apr. 23, 2020

Related U.S. Application Data

(63) Continuation of application No. 15/751,291, filed as application No. PCT/EP2017/079459 on Nov. 16, 2017, now Pat. No. 10,531,321.

(60) Provisional application No. 62/458,177, filed on Feb. 13, 2017.

(51) Int. Cl.
*H04W 24/08* (2009.01)
*H04L 1/18* (2006.01)
*H04L 5/00* (2006.01)
*H04W 28/02* (2009.01)
*H04L 1/00* (2006.01)

(52) U.S. Cl.
CPC ............. *H04W 24/08* (2013.01); *H04L 1/188* (2013.01); *H04L 1/1848* (2013.01); *H04L 5/0055* (2013.01); *H04W 28/0278* (2013.01); *H04L 1/0002* (2013.01); *H04L 1/0017* (2013.01)

(58) Field of Classification Search
CPC .................................................... H04L 1/1825
See application file for complete search history.

(56) References Cited

U.S. PATENT DOCUMENTS

| 6,519,223 B1 | 2/2003 | Wager et al. |
| 2007/0268861 A1 | 11/2007 | Diachina et al. |
| 2009/0103478 A1 | 4/2009 | Sammour et al. |

(Continued)

FOREIGN PATENT DOCUMENTS

| CN | 101444033 A | 5/2009 |
| JP | 2009538011 A | 10/2009 |
| JP | 2014131361 A | 7/2014 |

OTHER PUBLICATIONS

3rd Generation Partnership Project, "Technical Specification Group Radio Access Network; Evolved Universal Terrestrial Radio Access (E-UTRA); Packet Data Convergence Protocol (PDCP) specification (Release 14)", 3GPP TS 36.323 V14.1.0, Dec. 2016, pp. 1-39.

(Continued)

*Primary Examiner* — Mewale A Ambaye
(74) *Attorney, Agent, or Firm* — Coats & Bennett, PLLC

(57) ABSTRACT

Methods and devices for monitoring a radio link control, RLC, communication path for transmitting/receiving data units, DUs are disclosed. The methods/devices including or triggering determining a decline of the RLC communication path based on a timer for one or more unacknowledged/outstanding DUs transmitted/received on the RLC communication path.

26 Claims, 13 Drawing Sheets

(56) References Cited

U.S. PATENT DOCUMENTS

| | | | |
|---|---|---|---|
| 2009/0116399 A1 | 5/2009 | Ho et al. | |
| 2009/0119564 A1* | 5/2009 | Sagfors | H04L 1/1685 714/748 |
| 2010/0177701 A1* | 7/2010 | Maheshwari | H04L 1/1883 370/328 |
| 2011/0110263 A1* | 5/2011 | Yi | H04L 1/1841 370/252 |
| 2013/0194933 A1* | 8/2013 | Celik | H04L 1/1685 370/242 |
| 2014/0254351 A1 | 9/2014 | Newman et al. | |
| 2015/0208286 A1 | 7/2015 | Ozturk et al. | |
| 2016/0366008 A1* | 12/2016 | Zeng | H04L 43/06 |
| 2019/0246442 A1* | 8/2019 | Park | H04L 5/0055 |
| 2019/0394832 A1* | 12/2019 | Jiang | H04W 28/06 |

OTHER PUBLICATIONS

3rd Generation Partnership Project, "Technical Specification Group Radio Access Network; Evolved Universal Terrestrial Radio Access (E-UTRA); Radio Link Control (RLC) protocol specification (Release 13)", 3GPP TS 36.322 V13.2.0, Jun. 2016, pp. 1-45.

* cited by examiner

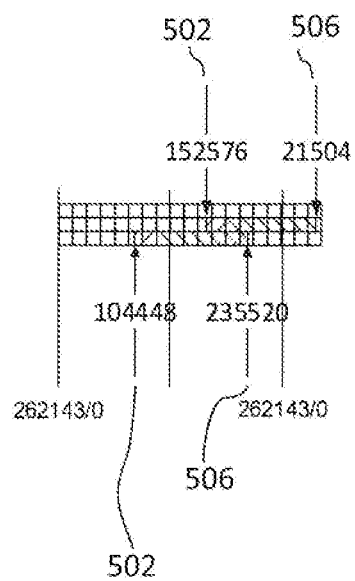
Fig. 5
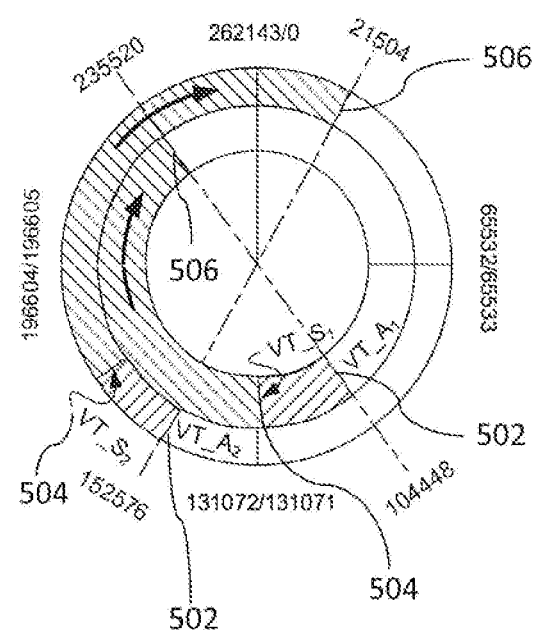
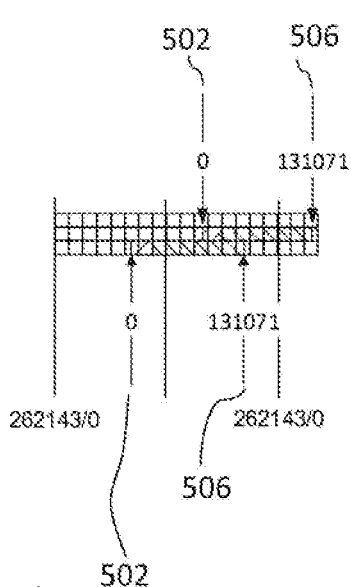
Fig. 6
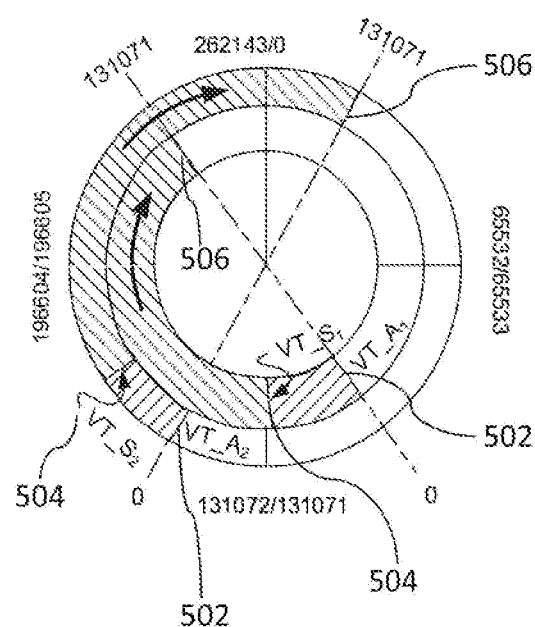

TECHNIQUE FOR MONITORING A RADIO LINK CONTROL (RLC)

RELATED APPLICATIONS

The present application is a continuation of U.S. patent application Ser. No. 15/751,291, which was filed on Feb. 8, 2018, which is a national stage application of PCT/EP2017/079459, which was filed Nov. 16, 2017, and claims benefit of U.S. Provisional Application 62/458,177, which was filed Feb. 13, 2017, the disclosures of each of which are incorporated herein by reference in their entirety.

TECHNICAL FIELD

The present disclosure generally relates to a technique for monitoring a radio communication. More specifically, methods and devices are provided for monitoring a Radio Link Control communication path.

BACKGROUND

Radio communication, e.g., according to Long Term Evolution (LTE) specified by the Third Generation Partnership Project (3GPP) uses a Radio Link Control (RLC) Acknowledge Mode (AM) protocol to provide reliable delivery of Packet Data Units (PDUs) by means of an Automatic Repeat reQuest (ARQ) procedure. A transmitting side transmits RLC PDUs with an RLC sequence number (SN) associated with each RLC PDU and polls the receiving side for a status report to acknowledge the RLC PDU was successfully received. An AM RLC entity at the transmitting side can receive an explicit negative acknowledgment (NACK) in a status report as a notification of reception failure by the peer AM RLC receiving entity for an Acknowledged Mode Data (AMD) PDU or for a portion of an AMD PDU, e.g., to trigger a retransmission of PDUs with RLC SNs for which the NACK was reported. There can also be implicit triggers for the retransmission, e.g., when the transmitting side times out waiting for the status report from the receiving side and is required to poll the receiving side but has no new data to send the poll request with.

When an AMD PDU or portion thereof is retransmitted, the RLC protocol of LTE requires the transmitting side to maintain one ReTx_count state variable in association with each SN. The ReTx_count state variable is incremented each time the RLC PDU with the corresponding RLC SN is retransmitted. If the ReTx_count for any RLC SN reaches maxReTx_Threshold number of retransmissions without receiving an acknowledgment (ACK) for the successful reception, a Radio Link Failure (RLF) declaration is indicated to the upper layers.

In New Radio (NR) according to 3GPP, the RLC layer works similar to LTE. One difference is that in NR the Medium Access Control (MAC) layer rather than the RLC layer concatenates upper layer data. More specifically, the MAC layer of NR multiplexes several Service Data Units (MAC SDUs) from the same logical channel. The AMD PDU from NR RLC thus contains either just one full RLC SDU (e.g., a Packet Data Convergence Protocol Data Unit or PDCP PDU) or just one segment of an RLC SDU (e.g., a segment of a PDCP PDU). Details of the ReTx_count for NR have not yet been decided in 3GPP.

One problem with existing RLC AM tracking of a ReTx_count per RLC SN is that it imposes a large memory burden in terms of amount of meta data and related processing cost just to provide a mechanism that detects there may be some radio link problem. Especially in NR, with concatenation removed from the RLC layer, and much higher data rates as compared to LTE, the RLC SN size will need to be increased, e.g., to 18 bits, compared to the RLC SN size of 10 bits in LTE. Maintaining a ReTx_count per transmitted RLC SN with such a large RLC SN space and at much higher SN rate adds a considerable burden on the memory requirements as well as increasing strain on the processing and number of memory accesses.

The purpose of the ReTx_count is to track the number of retransmissions of a Data Unit (DU) and compare it with a limit, maxReTx_Threshold, for continued retransmission. A notification, the RLF, is indicated to upper layers if the limit is exceeded.

However, this mechanism does not imply any control on the time that is required for the retransmissions. From an end-to-end service perspective, if the transmitting side has not received an ACK for all segments of an SN within a certain time period, the consequences are the same independent of details that cause the failure to deliver the DUs or to acknowledge their reception. Typically, the consequence to end-to-end service is based on time duration in which a higher layer packet or message cannot be delivered and is not dependent on low level details of the RLC protocol.

The actual time from the first MAC Hybrid ARQ (HARQ) failure until RLF is indicated may largely vary. The time for RLF indication depends not only on the settings of RLC parameters such as t-Poll Retransmit and maxReTx_Threshold. Also other circumstances beyond the control of RLC may have an impact. The load in the system and other settings in a User Equipment (UE), such as Discontinuous Reception (DRX), influence when retransmissions can take place. Again, from an end-to-end service perspective, it does not matter what causes the transmission problem and it is just the time duration in which a higher layer packet or message cannot be delivered that matters.

The conventional mechanism for RLF detection based on a maximum number of retransmissions is also inefficient, because a lot of scheduling attempts are required to trigger the RLF. In LTE, a typical configuration for the UE in the uplink direction is to have a maxReTx_Threshold set to 32, meaning that it requires at least 32 scheduling attempts that each fail to be successfully delivered by the radio interface. Even worse, many more attempts may be needed in case different PDUs are scheduled for different re-transmission attempts. This means that, if the radio condition is such that RLF is not detected by other means, it will require quite a lot of wasted resources to trigger an RLF, because many scheduling requests must be granted for a UE, even though the radio access network knows that the radio condition relative to the UE is very bad. In LTE, the radio access network usually continues to schedule the UE even when it is in very bad radio condition so that the scheduling request is likely to fail, because it is important to trigger RLF for the maximum number of RLC retransmissions if required.

SUMMARY

Accordingly, there is a need for a radio link control technique that is efficient in terms of memory resources and/or processing load. Alternatively, or in addition, there is need for a technique that allows controlling the time until a radio problem is detected. Alternatively, or in addition, there is need for a technique that avoids wasteful scheduling of radio resources.

As to one aspect, a method of monitoring a Radio Link Control (RLC) communication path for transmitting Data Units (DUs) is provided. The method comprises a step of determining a decline of the RLC communication path based on a timer for one or more unacknowledged DUs transmitted on the RLC communication path.

Herein, acknowledgment (ACK) may refer to a positive ACK if not stated otherwise, e.g., by negative ACK or NACK. Being "unacknowledged" may encompass the absence of an ACK or the state of an outstanding ACK. The ACK may be explicit (e.g., in a feedback) or implicit. Any DU may be implicitly acknowledged by a response (e.g., a data response or a signaling response) to the corresponding DU.

The technique can reduce the amount of memory (e.g., for metadata or state variables) needed to be tracked, e.g., by an RLC ARQ mechanism, in order to determine the decline of the RLC communication path, e.g., a bearer failure or a Radio Link Failure (RLF) condition or any precursor thereof. The determining may be implemented by indicating the decline (e.g., to layers of a protocol stack other than the RLC layer or within the RLC layer) and/or by controlling the usage (e.g., scheduling) of the RLC communication path based on the timer. For example, based on the timer, a radio link obstruction is managed.

The technique can control the duration of retransmissions based on the timer. The technique may be implemented for an age-based determination (e.g., indication and/or counter-action) of the decline. The technique may prevent or reduce the occurrence of a stalled transmitting window.

While the technique may be implemented in an RLC protocol of 5G New Radio (NR), the technique is not limited to 5G NR. Rather, the technique can be applied to any radio technology, e.g. LTE according to 3GPP or Wi-Fi according to IEEE 802.11.

Based on the timer, the technique can detect the decline of the RLC communication path, e.g., a transmission problem. The decline may be caused by at least one of (a) failure to correctly transfer some DU, or for the receiver to receive the DU, for instance due to bad radio conditions; (b) failure to receive some status report, for instance due to bad radio conditions; and (c) failure to schedule DUs or a status report for a long time due to other reasons, such as high load.

The technique can determine the decline timely and efficiently, e.g. independent of the detailed cause of the decline. A retransmission counter, such as ReTx_count, is not sufficient to control the duration of retransmissions in above case (a), since the time until an RLF is triggered may vary a lot. Case (b) may be handled provided a poll for requesting the status report is transmitted by the transmitting station using the same SN (which not the case in conventional systems transmitting the poll with new data, e.g., the SN indicated by a state variable VT(S) according to 3GPP, unless there is no new data to transmit). Case (c) is not handled at all in conventional systems. The technique can be implemented to determine the decline in any of the above cases.

The method may be performed by a transmitting station, e.g., a node of a Radio Access Network (RAN) or a UE communicating with the RAN. The method may be performed on the transmitting side of the RLC communication path.

The method may comprise or trigger a step of monitoring a first state variable (e.g., VT(A) according to 3GPP) for a lower edge of the transmitting window (e.g., an RLC transmitting window). The timer may supervise the time passed since the oldest not acknowledged DU was sent, the time passed since the first state variable was updated and/or the time passed since the transmitting window was advanced.

Determining the decline based on the timer may be implemented by and/or may trigger at least one of indicating the decline (e.g., a radio link problem) when the timer exceeds a threshold; actions appropriate to the RLF; and forwarding the DUs from a first to a second RLC communication path. Alternatively, or in addition, determining the decline based on the timer may be implemented by and/or may trigger transmitting a control message to an RLC communication peer entity.

Unacknowledged DUs may encompass DUs for which no acknowledgment has been received (e.g., at the transmitting sides of the corresponding DUs). The DUs transmitted on the RLC communication path may be briefly referred to as transmitted DUs. The unacknowledged DUs transmitted on the RLC communication path may also be referred to as transmitted and unacknowledged DUs. The unacknowledged DUs transmitted on the RLC communication path may be briefly referred to as unacknowledged DUs or as DUs in flight.

The method may further comprise or trigger at least one of a step of transmitting the one or more DUs on the RLC communication path in an acknowledged mode; and a step of initiating the timer upon transmitting the one or more DUs. The timer may be initiated upon transmitting the one or more DUs if all DUs previously transmitted on the RLC communication path have been acknowledged.

Herein, reinitiating the timer may also be referred to as starting the timer. The timer may be reinitiated by setting the timer (e.g., the time or duration indicated by the timer) to zero.

The timer may be maintained if one or more older DUs are unacknowledged. The timer may be maintained as long as at least one of the one or more transmitted DUs is unacknowledged.

Maintaining the timer may also be referred to as running the timer. Maintaining the timer may be implemented by storing a time stamp corresponding to the initial time (or start time) of the timer. The time or duration indicated by the timer may be evaluated by the difference between the current time and the stored time stamp. Alternatively, or in addition, maintaining the timer may be implemented by periodically increasing the time or duration indicated by the timer.

The timer may be at least one of stopped and reinitiated upon receiving an acknowledgment for the one or more unacknowledged DUs transmitted on the RLC communication path. The DUs may be transmitted in bursts on the RLC communication path. A subsequent burst may be transmitted after all DUs transmitted in the previous burst have been acknowledged.

Herein, reinitiating the timer may also be referred to as restarting the timer. The timer may be reinitiated by setting the timer (e.g., the time or duration indicated by the timer) to zero.

The timer may be indicative of the time elapsed since the earliest transmission of the one or more unacknowledged DUs on the RLC communication path or the transmission of the oldest DU among the unacknowledged DUs transmitted on the RLC communication path. The transmission of the oldest DU may relate to the first transmission of the oldest DU, e.g., not including retransmission of the oldest DU.

The "oldest" DU among the unacknowledged DUs transmitted on the RLC communication path may be the DU in the earliest transmission among the unacknowledged DUs transmitted on the RLC communication path.

Each of the transmitted DUs may include and/or may be associated with a Sequence Number (SN). Each of the transmitted DUs may include or may be associated with a different or unique SN. The SN may be included in a header of the DU or in a header attached to the DU. The DUs may be transmitted in sequence according to the SN.

The oldest DU among the unacknowledged DUs transmitted on the RLC communication path may include and/or may be associated with the least SN of the unacknowledged DUs transmitted on the RLC communication path. The SN of the oldest DU among the unacknowledged DUs transmitted on the RLC communication path may be the minimum of the SNs of the unacknowledged DUs transmitted on the RLC communication path.

The method may further comprise or trigger a step of maintaining a first state variable that is indicative of the SN of the earliest transmission of the unacknowledged DUs on the RLC communication path and/or the oldest DU among the unacknowledged DUs transmitted on the RLC communication path. The first state variable may be referred to as VT_A or VT(A). The first state variable may be implemented according to the technical specification 3GPP TS 36.322 (e.g., document 3GPP TS 36.322 V13.2.0, clauses 5.1.3 and 7.1).

The timer may be maintained as long as the first state variable remains unchanged. Alternatively, or in addition, the timer may be maintained as long as the transmitting window remains unchanged.

Maintaining the first state variable may include advancing the first state variable upon receiving an acknowledgment for the DU including or associated with the SN indicated by the first state variable. Advancing the first state variable may include incrementing the first state variable. E.g., the first state variable may be shifted to the second-oldest DU among the unacknowledged DUs transmitted on the RLC communication path.

Alternatively, or in addition, a transmitting window may be maintained. The transmitting window may comprise the SNs of the transmitted and unacknowledged DUs. The transmitting window may further comprise the SNs of DUs to be transmitted, e.g., DUs stored in a transmitting buffer. The SNs comprised by the transmitting window may be equal to or greater than the first state variable. That is, the first state variable may be indicative of a lower edge of the transmitting window. The transmitting window may be advanced upon receiving the acknowledgment for the DU including or associated with the SN indicated by the first state variable. An upper edge of the transmitting window may be equal to the first state variable plus a (e.g., predefined) size of the transmitting window.

The timer may be at least one of stopped and reinitiated upon receiving an acknowledgment for the DU including or associated with the SN indicated by the first state variable or upon advancing the first state variable. Alternatively, or in addition, the timer may be stopped and/or reinitiated upon advancing the transmitting window.

The method may further comprise or trigger a step of maintaining a second state variable that is indicative of the SN of the DU to be transmitted next. The second state variable may be referred to by VT_S or VT(S). The second state variable may be implemented according to the technical specification 3GPP TS 36.322 (e.g., document 3GPP TS 36.322 V13.2.0, clauses 5.1.3 and 7.1).

Maintaining the second state variable may include advancing the second state variable upon transmitting the next DU. Advancing the second state variable may include incrementing the second state variable. E.g., the second state variable may be shifted to the second-next DU to be transmitted.

Alternatively, or in addition, a feedback window may be maintained. The feedback window may also be referred to as status window. The feedback window may comprise the SNs of the transmitted and unacknowledged DUs. The SNs comprised by the feedback window may be equal to or greater than the first state variable. That is, the first state variable may be indicative of a lower edge of the feedback window. Alternatively, or in addition, the SNs comprised by the feedback window may be less than the second state variable. That is, the second state variable less one may be indicative of an upper edge of the feedback window.

The timer may be maintained as long as the feedback window remains unchanged. Alternatively, or in addition, the timer may be stopped and/or reinitiated upon advancing the feedback window.

The RLC communication path may be uniquely associated with a radio bearer. The radio bearer may be configured for in-sequence communication.

The timer may be maintained as long as the oldest DU among the unacknowledged DUs transmitted on the RLC communication path remains unacknowledged. The timer may be at least one of stopped and reinitiated upon receiving an acknowledgment for the oldest DU among the unacknowledged DUs transmitted on the RLC communication path. Reinitiating the timer may include setting the timer (e.g., the time or duration indicated by the timer) to zero.

The timer may measure the age of the transmitting window and/or the feedback window. The timer may measure the age of the oldest unacknowledged DU only when initialized at transmission of the corresponding DU. When the timer is reset to zero responsive to an ACK, the timer may measure a duration less than the age of the oldest unacknowledged DU.

Alternatively, reinitiating the timer may include initiating the timer according to the time elapsed since transmitting the second-oldest DU among the transmitted and unacknowledged DUs. The timer may measure the age of the DU.

The timer may be reinitiated or set to indicate the time elapsed since the one or more unacknowledged DUs have been transmitted. The timer may be indicative of the age of the oldest DU among the unacknowledged DUs transmitted on the RLC communication path.

The timer may be maintained if a negative acknowledgment (NACK) is received. A status report from the receiving side, e.g., a receiving peer RLC entity, may be indicative of the NACK.

An acknowledgment (i.e., a positive acknowledgment or ACK) and/or a negative acknowledgment (NACK) for at least one of the transmitted DUs may be received in a status report. The status report may be received on the same RLC communication path. The status report may be received by the same RLC entity transmitting the DUs on the RLC communication path.

A poll request for the status report may be transmitted using the oldest DU among the unacknowledged DUs transmitted on the RLC communication path. The timer may be initiated upon transmitting the poll request for the status report, e.g., if the timer is stopped or not already maintained.

The decline may be determined upon elapse of at least one duration of the timer. Different durations of the timer may be implemented by checking the same timer or by checking different instances of the timer.

Different types or levels of the decline may be determined upon elapse of different durations of the timer. For example, the longer the duration, the more severe may be the decline determined for the RLC communication path.

A measure to restore transmission of the one or more DUs may be triggered upon elapse of at least one duration of the timer. Different measures or events may be triggered upon elapse of different durations of the timer. For example, the longer the duration, the stronger is the measure triggered by the determination.

At least one of determining the decline and triggering the measure or event may be implemented by, or may include, indicating or reporting the decline to a higher or lower layer of a communication protocol stack. The higher layer may include one or more sublayers of a layer controlling or implementing the timer, e.g., a sublayer of the RLC layer. The higher layer may include a Radio Resource Control (RRC) layer, a Packet Data Convergence Protocol (PDCP) layer, the RLC layer or an upper sublayer of the RLC layer. The lower layer may include a Medium Access Control (MAC) layer.

The DU may include or may be implemented by an RLC PDU and/or a PDCP SDU.

Determining the decline may include, upon elapse of a first duration of the timer, determining or indicating the RLF. The length of the first duration may allow for several attempts to poll the status report (e.g., by transmitting the poll request several times). Alternatively, or in addition, the first duration may allow for several Automatic Repeat reQuests (ARQs), e.g., by receiving NACKs in the status report, and/or several retransmissions, e.g., responsive to the received NACKs.

Alternatively, or in addition, the decline may be determined upon elapse of at least one second duration of the timer. Each of the one or more second durations of the timer may trigger a measure or event. Different events may be triggered upon expiry of the different second durations. Any subset of below examples for the events may be triggered.

A first example for the event may be reducing or suspending the transmission of DUs on the RLC communication path. A second example for the event may be reducing a rate or suspending of transmitting scheduling requests or scheduling assignments. A third example for the event may be reducing a rate or suspending of transmitting buffer status reports. A fourth example for the event may be reducing a channel quality indicator for a physical channel used by the RLC communication path. A fifth example for the event may be advancing the first state variable to equal the second state variable. A sixth example for the event may be advancing the first state variable to the SN of the next unacknowledged DU following an acknowledged DU transmitted on the RLC communication path.

A seventh example for the event may be switching from the RLC communication path to another RLC communication path. The RLC communication path and the other RLC communication path may be first and second RLC legs, respectively, for a dual connectivity. The switching may include retransmitting the one or more unacknowledged DUs through the second RLC leg different from the first RLC leg through which the one or more DUs have been transmitted.

At least one of the first duration and the second duration may depend on a quality requirement. The quality requirement may be associated with the one or more DUs. Alternatively, or in addition, the quality requirement may be associated with a radio access node that transmits or receives the DUs, or with a UE that transmits or receives the DUs. Alternatively, or in addition, the quality requirement may be associated with the RLC communication path or a bearer of the one or more DUs. Alternatively, or in addition, the quality requirement may be associated with an application or service providing payload of the one or more DUs.

The quality requirement may be defined by an application or service underlying the one or more DUs. Alternatively, or in addition, the quality requirement may include a Quality of Service (QoS) requirement, e.g., according to a QoS Class Identifier (QCI).

Determining the decline may include, or may be implemented by, signaling the decline to an RLC communication peer, e.g., the receiving station or an RLC entity of the receiving station. A receiver of the one or more DUs may include the RLC communication peer. The RLC communication peer may be implemented by an RLC entity. The signaling may also be referred to as reporting. At least one of advancing the first state variable, advancing the second state variable and switching the RLC communication path may be signaled to the RLC communication peer.

The method may be performed by a radio access node of a RAN. Alternatively, or in combination, the method may be performed by a radio terminal connected or connectable with a RAN.

The method may be performed by, or by means of, a transmitting station. The transmitting station may be any device configured for radio communication or wireless communication. E.g., a station of a radio network may transmit the data. The DU may be transmitted in a radio communication or wireless communication, e.g., to one or more receiving stations of the radio network.

As to another aspect, a method of monitoring an RLC communication path for receiving DUs is provided. The method comprises a step of determining a decline of the RLC communication path based on a timer for one or more outstanding DUs to be received on the RLC communication path.

Each of the DUs to be received may include and/or may be associated with a SN. The SN of the one or more outstanding DUs may be less than the SN of at least one DU received on the RLC communication path.

The timer may be initiated upon receiving at least one DU, whose SN has a gap to DUs received in sequence on the RLC communication path.

The method may further comprise or trigger a step of maintaining a third state variable that is indicative of the SN following the highest SN of the DUs received in sequence on the RLC communication path. The third state variable may be a receive state variable for a receiving window, e.g., an RLC receiving window. The third state variable may be referred to as VT_R or VT(R). The third state variable may be implemented according to the technical specification 3GPP TS 36.322 (e.g., document 3GPP TS 36.322 V13.2.0, clauses 5.1.3 and 7.1).

The method may further comprise or trigger a step of maintaining a fourth state variable that is indicative of the SN following the highest SN of the DUs received on the RLC communication path. The fourth state variable may be referred to as VT_H or VT(H). The fourth state variable may be implemented according to the technical specification 3GPP TS 36.322 (e.g., document 3GPP TS 36.322 V13.2.0, clauses 5.1.3 and 7.1).

The SN of the one or more outstanding DUs may be equal to or greater than the third state variable. The SN of the one or more outstanding DUs may be less than the fourth state variable.

The timer may be maintained as long as the fourth state variable is greater than the third state variable. The timer may be stopped if the fourth state variable is equal to the third state variable.

The timer may be reinitiated if the third state variable advances to a SN less than the fourth state variable.

Determining the decline may include performing or triggering an event upon elapse of at least one third duration of the timer. Any subcombination of below examples of the events may be triggered or performed. A first example of the event may be reducing a rate or suspending of transmitting scheduling grants. A second example of the event may be reducing a channel quality indicator for a physical channel used by the RLC communication path. A third example of the event may be advancing the third state variable to equal the fourth state variable. A fifth example of the event may be advancing the third state variable to the SN of the next outstanding DU following a DU received on the RLC communication path. A sixth example of the event may be switching from the RLC communication path to another RLC communication path. The RLC communication path may be paired with the other RLC communication path in dual connectivity.

Alternatively, or in addition, any of above events may be triggered or performed responsive to receiving a signaling from an RLC communication peer. At least one of advancing the third state variable and switching the RLC communication path may be signaled by the RLC communication peer.

The method may be performed by a receiving side of the RLC communication path, e.g., a node in a RAN or a UE communicating with the RAN.

The technique can reduce the amount of memory (e.g., for metadata or state variables) needed to be tracked, e.g., by an RLC ARQ mechanism, in order to determine the decline of the RLC communication path, e.g., a bearer failure or RLF condition or any precursor thereof. The determining may be implemented by indicating the decline (e.g., to layers of a protocol stack other than the RLC layer or within the RLC layer) and/or by controlling the usage (e.g., scheduling) of the RLC communication path based on the timer. For example, based on the timer, a radio link obstruction may be managed.

The method may comprise or trigger a step of monitoring the third state variable for the lower edge of the receiving window. The timer may supervise the time since the oldest SN gap was detected.

The events may include moving the third state variable to the next but oldest SN gap when the timer exceeds a threshold. Optionally, same or another event includes transmitting a control message to the RLC communication peer, e.g., at the transmitting station.

The method may be performed by, or by means of, a receiving station. The receiving station may be any device configured for radio communication or wireless communication. E.g., one or more stations of a radio network may receive the one or more DUs. The receiving station may be embodied by any station defined above in the context of the one method aspect. The DUs may be received in a radio communication or wireless communication, e.g., from a transmitting station of the radio network.

The method may further comprise any feature and/or achieve any advantage disclosed in the context of the one method aspect and/or may comprise one or more steps corresponding to any of the steps of the one method aspect.

Any of the transmitting and receiving stations may be embodied as a radio device or terminal, e.g., configured for peer-to-peer communication (e.g., on a sidelink) and/or for accessing a radio access network (e.g. an uplink and/or downlink). The station may be a User Equipment (UE, e.g., a 3GPP UE), a mobile or portable station (STA, e.g. a W-Fi STA), a device for machine-type communication (MTC) or a combination thereof. Examples for the UE and the mobile station include a mobile phone and a tablet computer. Examples for the portable station include a laptop computer and a television set. Examples for the MTC device include robots, sensors and/or actuators, e.g., in manufacturing, automotive communication and home automation. The MTC device may be implemented in household appliances and consumer electronics. Examples for the combination include a self-driving vehicle, a door intercommunication system and an automated teller machine.

Alternatively, or in addition, any of the transmitting and receiving stations may be embodied as a controlling station of the radio network or a radio network node of the radio network, e.g. a radio access node. Examples for the controlling station or the radio access node include a base station (e.g., a 3G base station or Node B, 4G base station or eNodeB, or a 5G base station or gNodeB), an access point (e.g., a Wi-Fi access point) and a network controller (e.g., according to Bluetooth, ZigBee or Z-Wave).

The radio network may include at least one controlled station (e.g., the UE, the mobile or portable station and/or the MTC device) and/or at least one controlling station (e.g., the base station, the access point and/or the network controller). The at least one controlling station may define, or may be part of, a radio access network (RAN), e.g., according to the Global System for Mobile Communications (GSM), the Universal Mobile Telecommunications System (UMTS), Long Term Evolution (LTE) or New Radio (NR).

Any method aspect may be implemented on a Physical Layer (PHY), a Medium Access Control (MAC) layer, a Radio Link Control (RLC) layer and/or a Radio Resource Control (RRC) layer of a protocol stack for the radio communication.

As to another aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., via the radio network and/or via the Internet and/or by the transmitting station. Alternatively, or in addition, the method may be encoded in a Field-Programmable Gate Array (FPGA) and/or an Application-Specific Integrated Circuit (ASIC), or the functionality may be provided for download by means of a hardware description language.

As to one device aspect, a device for monitoring an RLC communication path for transmitting DUs is provided. The device is configured to perform the one method aspect. Alternatively, or in addition, the device may comprise a determining unit configured to determine a decline of the RLC communication path based on a timer for one or more unacknowledged DUs transmitted on the RLC communication path.

As to another device aspect, a device for monitoring an RLC communication path for receiving DUs is provided. The device is configured to perform the other method aspect. Alternatively, or in addition, the device may comprise a determining unit configured to determine a decline of the RLC communication path based on a timer for one or more outstanding DUs to be received on the RLC communication path.

As to a further device aspect, a device for monitoring an RLC communication path for transmitting DUs is provided. The device comprises at least one processor and a memory. Said memory comprises instructions executable by said at least one processor whereby the device is operative to determine a decline of the RLC communication path based on a timer for one or more unacknowledged DUs transmitted on the RLC communication path.

As to a further device aspect, a device for monitoring an RLC communication path for receiving DUs is provided. The device comprises at least one processor and a memory. Said memory comprises instructions executable by said at least one processor whereby the device is operative to determine a decline of the RLC communication path based on a timer for one or more outstanding DUs to be received on the RLC communication path.

As to a further aspect, a device for monitoring an RLC communication path for transmitting DUs is provided. The device may comprise one or more modules for performing the one method aspect. Alternatively, or in addition, the device comprises a determination module for determining a decline of the RLC communication path based on a timer for one or more unacknowledged DUs transmitted on the RLC communication path.

As to a further aspect, a device for monitoring an RLC communication path for receiving DUs is provided. The device may comprise one or more modules for performing the other method aspect. Alternatively, or in addition, the device comprises a module for determine a decline of the RLC communication path based on a timer for one or more outstanding DUs to be received on the RLC communication path.

The devices and/or the stations may further include any feature disclosed in the context of the method aspects. Particularly, any one of the units and modules, or a further unit or module, may be configured to perform or initiate one or more of the steps of any one of the method aspects.

BRIEF DESCRIPTION OF THE DRAWINGS

Further details of embodiments of the technique are described with reference to the enclosed drawings, wherein:

FIGS. 5 and 6 schematically illustrate exemplary representations of a transmitting window;

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a 5G New Radio (NR) implementation, it is readily apparent that the technique described herein may also be implemented in any other radio network, including 3GPP LTE or a successor thereof, Wireless Local Area Network (WLAN) according to the standard family IEEE 802.11, Bluetooth according to the Bluetooth Special Interest Group (SIG), particularly Bluetooth Low Energy and Bluetooth broadcasting and/or ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
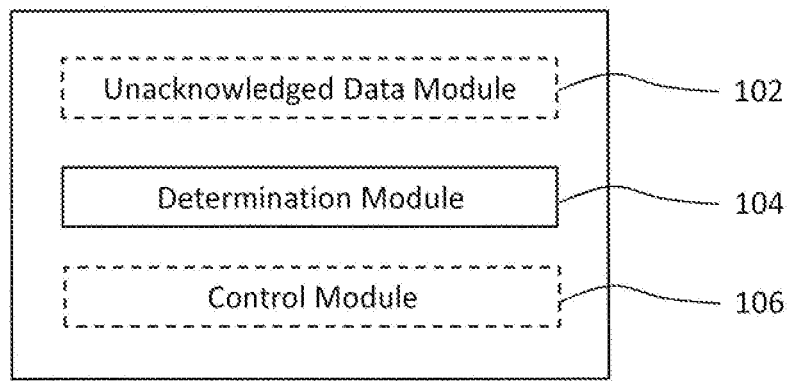
FIG. 1 shows a schematic block diagram of a device for monitoring a radio link control communication path for transmitting data units.

FIG. 1 schematically illustrates a block diagram of a device for monitoring a radio link control (RLC) communication path for transmitting data units (DUs), which device is generically referred to by reference sign 100. The device 100 comprises a determination module 104 that determines a decline of the RLC communication path based on a timer for one or more unacknowledged DUs transmitted on the RLC communication path.

The device 100 may be connected to and/or part of a radio network. The device 100 may be embodied by or at a transmitting station of the radio network, nodes connected to the radio network for controlling the transmitting station or a combination thereof. For example, the device 100 may be an RLC transmitter including one or more transmitting RLC entities.

Optionally, the device 100 further comprises an unacknowledged data module 102 that maintains a timer for unacknowledged DUs transmitted on the RLC communication path. The timer is used by the module 104. Alternatively, or in addition, the device 100 comprises a control module 106 that controls usage of the RLC communication path responsive to the decline determined by the module 104.

Figure 2:
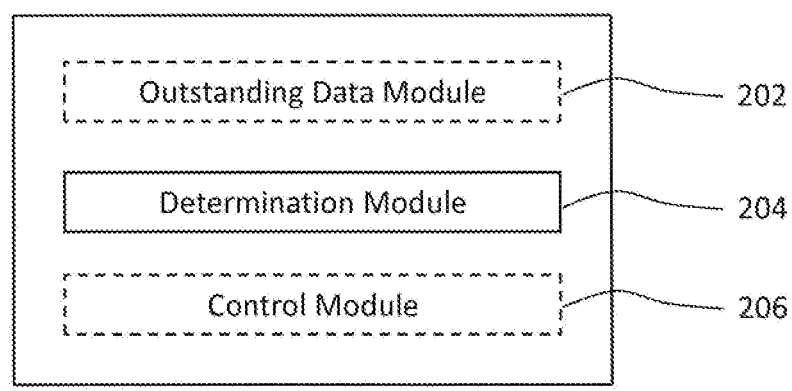
FIG. 2 shows a schematic block diagram of a device for monitoring a radio link control communication path for receiving data units.

FIG. 2 schematically illustrates a block diagram of a device for monitoring an RLC communication path for receiving DUs, which device is generically referred to by reference sign 200. The device 200 comprises a determination module 204 that determines a decline of the RLC communication path based on a timer for one or more outstanding DUs to be received on the RLC communication path.

Optionally, the device 200 further comprises an outstanding data module 202 that maintains a timer for outstanding DUs to be received on the RLC communication path. The timer is used by the module 104. Alternatively, or in addition, the device 200 comprises a control module 206 that controls usage of the RLC communication path responsive to the decline determined by the module 204.

The device 200 may be connected to and/or part of a radio network. The device 200 may be embodied by or at a receiving station of the radio network, nodes connected to the radio network controlling the receiving station or a combination thereof. For example, the device 200 may be an RLC receiver including one or more receiving RLC entities.

Any of the modules of the device 100 and the device 200 may be implemented by units configured to provide the corresponding functionality.

Each of the transmitting station and the receiving station may include a base station (e.g., a network controller or a W-Fi access point) or a radio access node (e.g. a 3G Node B, a 4G eNodeB or a 5G gNodeB) of the radio network (e.g., more specifically, of a radio access network providing radio access within the radio network). Alternatively, or in addition, each of the transmitting station and the receiving station may include a mobile or portable station or a radio device connectable to the radio network (e.g., more specifically, connectable to a radio access network providing radio access within the radio network). The radio device may be a User Equipment (UE) or a device for Machine-Type Communication (MTC), e.g., road vehicles. Alternatively, or in addition, each of the transmitting and receiving stations may be configured to provide radio access and/or to wirelessly connect to each other, e.g., in an ad-hoc radio network or via 3GPP sidelinks.

Figure 3:
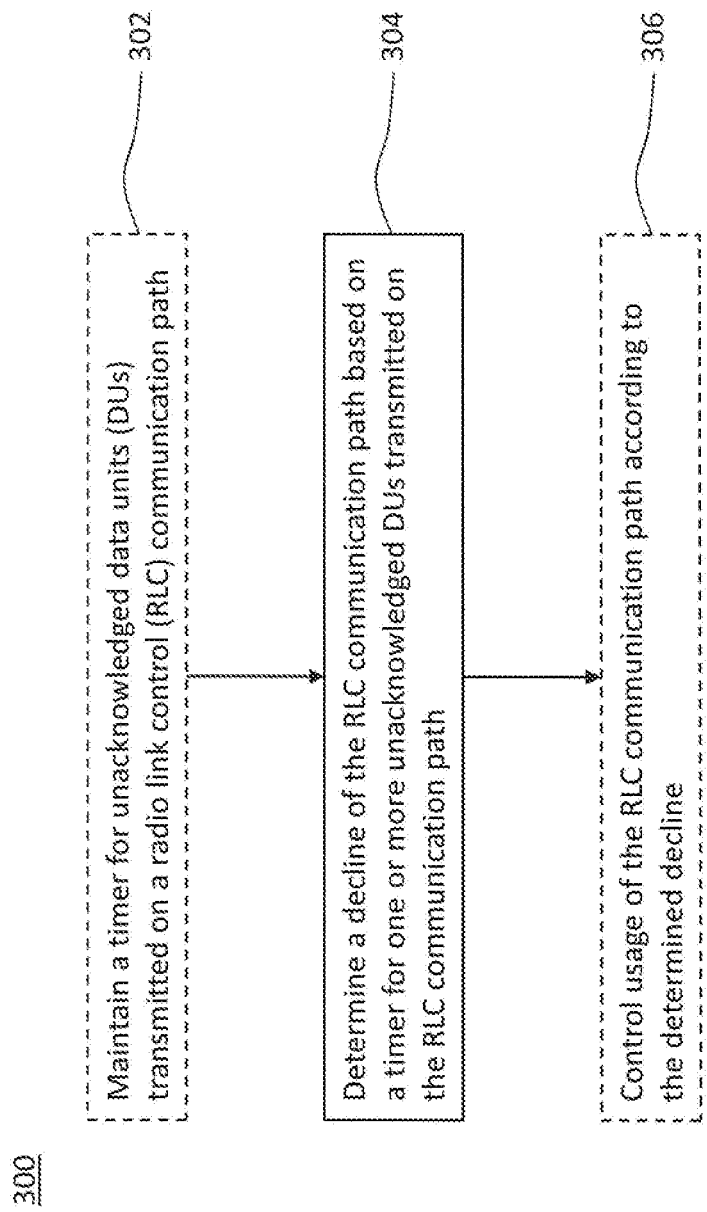
FIG. 3 shows a flowchart for a method of monitoring a radio link control communication path for transmitting data units, which is implementable by the device of FIG. 1.

FIG. 3 shows a flowchart for a method 300 of monitoring an RLC communication path for transmitting DUs. The method 300 comprises a step 304 of determining a decline of the RLC communication path based on a timer for one or more unacknowledged DUs transmitted on the RLC communication path.

The method may further comprise a step 302 of maintaining the timer for the unacknowledged DUs transmitted on the RLC communication path, and/or a step 306 of controlling usage of the RLC communication path according to the decline determined in the step 304.

The method 300 may be performed by the device 100, e.g., at or using the transmitting station of the radio network. For example, the modules 102, 104 and 106 may perform the steps 302, 304 and 306, respectively.

Figure 4:
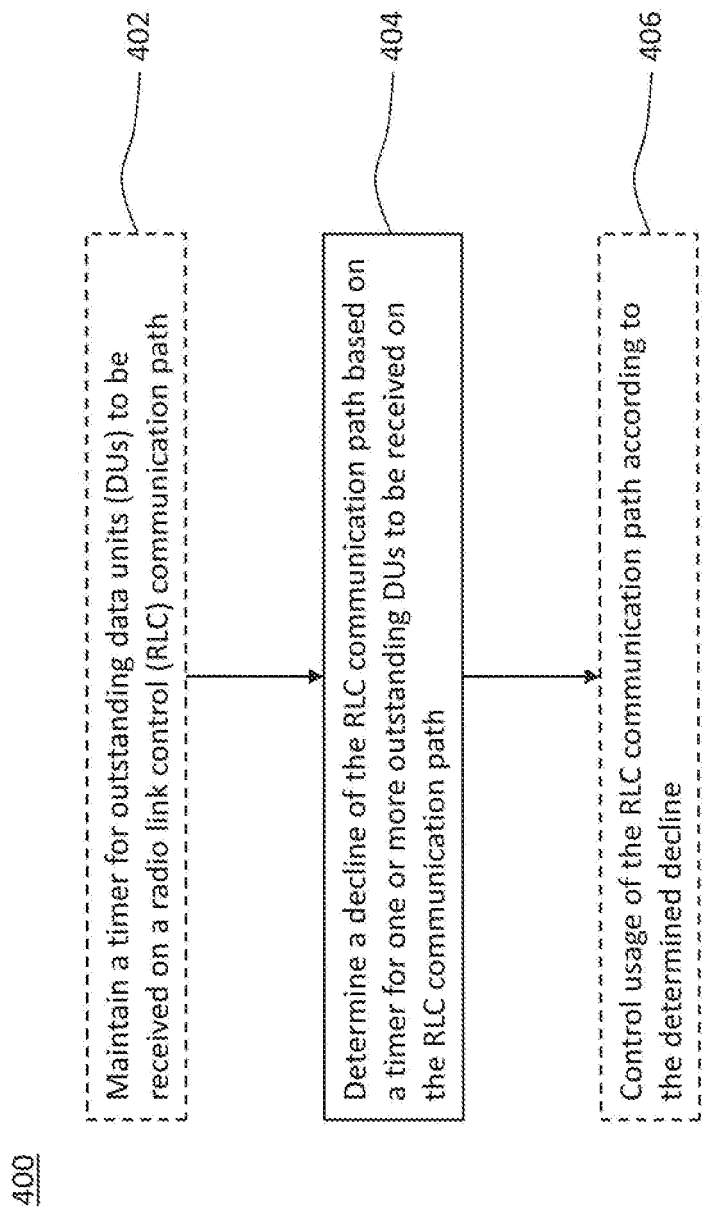
FIG. 4 shows a flowchart for a method of monitoring a radio link control communication path for receiving data units, which is implementable by the device of FIG. 2.

FIG. 4 shows a flowchart for a method 400 of monitoring an RLC communication path for receiving DUs. The method 400 comprises a step 404 of determining a decline of the RLC communication path based on a timer for one or more outstanding DUs to be received on the RLC communication path.

The method may further comprise a step 402 of maintaining the timer for the outstanding DUs to be received on the RLC communication path, and/or a step 406 of controlling usage of the RLC communication path according to the decline determined in the step 404.

The method 400 may be performed by the device 200, e.g., at or using the receiving station. For example, the modules 202, 204 and 206 may perform the steps 402, 404 and 406, respectively.

The technique is described in more detail for a 5G NR implementation using standardized state variables (e.g., VT_S and VT_A maintained by the device 100 and/or VT_R and VT_H maintained by the device 200).

Based on the timer, each of the methods 300 and 400 controls when to determine (e.g., declare and/or indicate) a radio link failure (RLF) to higher layers in the step 304 and 404, respectively. An effective approach with low complexity (as to memory and/or processing resources) is presented, wherein the RLC transmitter as the device 100 declares the RLF when the device 100 has unacknowledged transmitted data (i.e., VT_S !=VT_A, wherein "!=" denotes "being unequal" or, in this case, "greater than") but the transmitting window fails to advance before the first duration of the timer (which is also referred to as an RLF timer) denoted as T1 expires. Preferably, the first duration, i.e., the T1 timer value, is based on what is tolerable for the upper layer services carried on the radio bearer, and is still large enough to allow for several attempts to poll for status feedback and to perform one or more ARQs (e.g., and underlying HARQ) retransmissions. For brevity, the first duration and the corresponding trigger upon expiry of the first duration are referred to as "timer T1".

Alternatively, or in addition to the timer T1, the method 300 implements a second duration, i.e., a second timer value T2. The second duration is shorter than the first duration. For brevity, the second duration and the corresponding trigger upon expiry of the second duration are referred to as "timer T2". The timer T2 operates as the timer T1. Particularly, their starting time is the same. The timer T2 may be implemented as a second timer or as a second trigger of the same timer used for the timer T1.

The purpose of the T2 timer is not to trigger the RLF. The timer T2 is used as an indication of radio problems. Different actions may then be done to handle the bad radio condition if the timer T2 expires.

In one embodiment, e.g., for a dual connectivity configuration, the timer T2 is used to trigger forwarding of the one or more unacknowledged DUs (i.e., DUs for which RLC acknowledgment has not been received) on a currently used first RLC leg to another alternative RLC leg for transmission of the one or more unacknowledged DUs. The first and second RLC legs may be anchored and controlled by first and second RLC entities, respectively, at the transmitting side of the RLC communication path. The first and second RLC entities may be located at the transmitting station. Alternatively, only the first RLC entity is implemented at the RLC layer of the transmitting station. The RLC layer of the transmitting station controls the second RLC entity implemented at the RLC layer of another transmitting station.

Once confirmation has been received from the second RLC entity that the second leg can continue the retransmission (or further DU transmissions), the first RLC entity stops or pauses retransmitting the one or more unacknowledged DUs on the first RLC leg. Once confirmation is received from the second RLC entity that the one or more unacknowledged DUs have been successfully transferred via the second RLC leg, the first RLC entity may discard those DU from its transmitting window.

In another embodiment, e.g., for a single connectivity configuration, or in addition to the one embodiment, the timer T2 (or a further second duration) triggers a temporary stop or temporarily reduces (e.g., minimize) the number of DU retransmissions and/or the number transmissions of new DUs that the UE or the RAN may perform.

If, as a result of the expiration of the timer T2, the device 100 discards DUs that have not yet been successfully received by the RLC receiver, this may cause a conventional RLC receiver to get stuck in waiting for the missing SNs. To avoid such a deadlock in which the receiving window cannot be advanced, the device 200 as the RLC receiver maintains its timer, which is referred to as timer T3 for clarity. Based on the timer T3, the device 200 determines when it will be useless to wait any longer. The timer T3 is used to measure the time or duration passed since the DU corresponding to the lower end of the receiving window, which is indicted by the state variable VR_R, was first discovered as missing. When the timer T3 expires, the receiver may advance its receiving window and move to the next missing SN.

To this end, the device 200 detects missing DUs when there is at least one hole or gap in the receiving window, and if the oldest in-sequence missing DUs (i.e., the least SN sequence of missing DUs) have not been received within the time period specified by the timer T3, the device 200 advances the lower end of its receiving window to the start (i.e., the least SN) of the next SN sequence of missing DUs or sets the lower end of its receiving window to the SN following the latest received SN if there are no such holes or gaps.

An alternative or additional usage for the timer T3 (or a further timer T3 maintained by the device 200) is to let the device 200 trigger the RLF if T3 expires. Thus, the device 200 is also enabled to trigger the RLF for radio problems when the device 100 fails to transmit the DUs, e.g., if the receiver-triggered RLF is more efficient than the transmitter-triggered RLF. For instance, it is typically better if the UE triggers the RLF instead of the RAN, because the UE-triggered RLF often results in a shorter interruption in the data traffic.

FIG. 5 schematically illustrates RLC transmitter variables maintained at the device 100 as RLC transmitter. The state variables related to LTE RLC data transfer with 16 bits SN length can take values from 0 to 65535. In a NR implementation, the RLC layer may use 18-bit SNs. The state variables with 18 bits SN length can take values from 0 to 262143. Generally, state variables take values from 0 to $2^{[Field\ Length\ of\ the\ SN]}-1$.

At the device 100 as the RLC transmitter, the state variables VT_S and VT_A are maintained. VT_S may be defined according to, or similar to, the send state variable of 3GPP TS 36.322, which holds the value of the SN to be assigned for the next newly generated PDU. It is initially set to 0, and is incremented whenever the transmitting RLC entity of the device 100 sends a PDU with SN=VT_S.

VT_A is the acknowledgement state variable of 3GPP TS 36.322, which holds the value of the SN of the next PDU for which a positive acknowledgment (briefly: ACK) is to be received in-sequence. As such, VT_A serves as the lower edge of the transmitting window. It is initially set to 0, and is updated whenever the transmitting RLC entity of the device 100 receives an ACK for a PDU with SN=VT_A. The higher edge of the transmitting window is calculated based on VT_A according to VT_A+AM_Window_Size.

The state variable VT_A is also the so-called modulus base at the device 100, e.g., at the transmitting side of an AM RLC entity. This modulus base is subtracted from all the values involved, and then an absolute comparison is performed. By way of example, with 18 bits SN length, $$VT_A \leq SN < VT_S$$

is evaluated as $[VT_A-VT_A]$ modulo $262144 \leq [SN-VT_A]$ modulo $262144 < [VT_S-VT_A]$ modulo $262144$.

Also the device 200 as the RLC receiver maintains a few state variables. Particularly, there are 2 RLC state variables that are of interest here, VR_H and VR_S.

VR_H is the receive state variable of 3GPP TS 36.322, which holds the value of the SN following the SN of the RLC data PDU with the highest SN among received RLC data PDUs. It is initially set to 0, and is incremented whenever the RLC entity receives a PDU with SN=VR_H.

VR_R is the receive state variable of 3GPP TS 36.322, which holds the value of the SN following the last in-sequence completely received AMD PDU. As such, VR_R serves as the lower edge of the receiving window at the device 200. It is initially set to 0. The higher edge of the receiving window is calculated from VR_R according to VR_R+AM_Window_Size. VR_R is the modulus base at the device 200, e.g., at the receiving side of an AM RLC entity.

FIGS. 5 and 6 schematically illustrated examples for VT_A and VT_S in a normal operation of the RLC transmitter at reference sings 502 and 504, respectively. FIG. 5 schematically illustrates the transmitting window using a linear representation 500 and the circular representation 550. The upper edge of the transmitting window is indicated at reference sign 506.

In the example of FIG. 5, there is not only continuous data but also much data for the RLC transmitter to send, e.g. in an attempt to reach a peak rate of IP packets per second or physical layer bits per second. There is no underlying bottleneck that would cause congestion. The transmitting window 550 continuously moves forward as the device 100 receives status reports containing acknowledgements of reception from the device 200. FIG. 5 illustrates two positions of the transmitting window. At a first point in time, the transmitting window is at 104448 et sequentes in 18 bit SN space. Then, at a later second point in time, the transmitting window is at 152576 et sequentes in 18 bit SN space.

FIG. 6 schematically illustrates same positions of the transmitting window, as in FIG. 5, but calculated with the modulus base VT_A.

Figure 7:
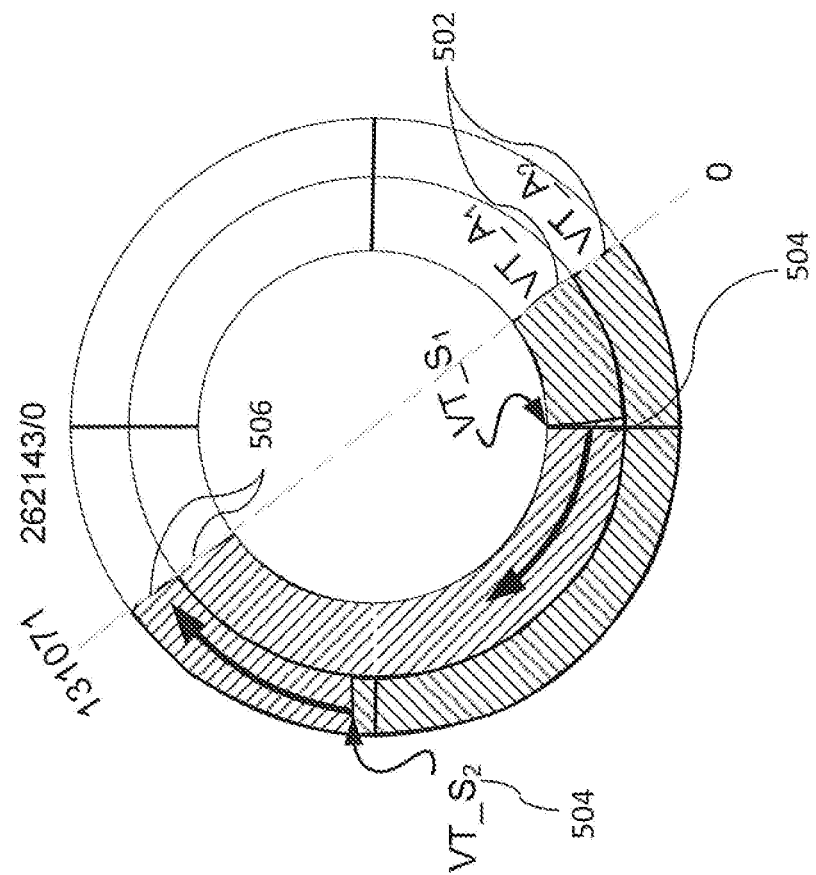
FIG. 7 schematically illustrates a stalled transmitting window.

FIG. 7 schematically illustrates an example for an onset of stalling the transmitting window 550, while the ACK for the SN indicated by VT_A continues to be missing. The reason can be physical circumstances that prevent the DUs with SN VT_A to be successfully received by the peer RLC receiver at the device 200. It can also be same circumstances or that other resources are missing to schedule the transmission of the status report, which prevent the reception of a status report at the device 100 that would clear the DUs with SN of VT_A as received. The window stalls when VT_S reaches the upper end of the window (at 131071 in FIG. 7). As a consequence, VT_A does not update, i.e., the transmitting window does not advance and begins to stall.

The technique can be combined or supplemented with mechanism defined for or similar to conventional LTE. For example, while VT_A stays missing, a retransmission counter, ReTx_count, is used. If a DU is considered for retransmission for the first time, the ReTx_count is associated with the DU is set to zero. Else, if the DU, or a portion of it, is pending for retransmission already, ReTx_count is incremented. If ReTx_count=maxReTx_Threshold, an indication of bearer failure is delivered to upper layers.

Further, e.g., as in conventional LTE, a poll request for polling the status report from the device 200 is transmitted and a timer t-PollRetransmit is started when either a threshold amount of bytes (e.g., pollByte) or DUs (e.g., pollPDU) is reached or if no new data can be transmitted (e.g. due to window stalling). When the timer t-PollRetransmit expires, a poll request is transmitted and the timer t-PollRetransmit is started again. If there is (still) no new data to send (e.g. due to window stalling), the DU with SN=VT_S−1 or any DU which has not been positively acknowledged is considered for retransmission.

Figure 8:
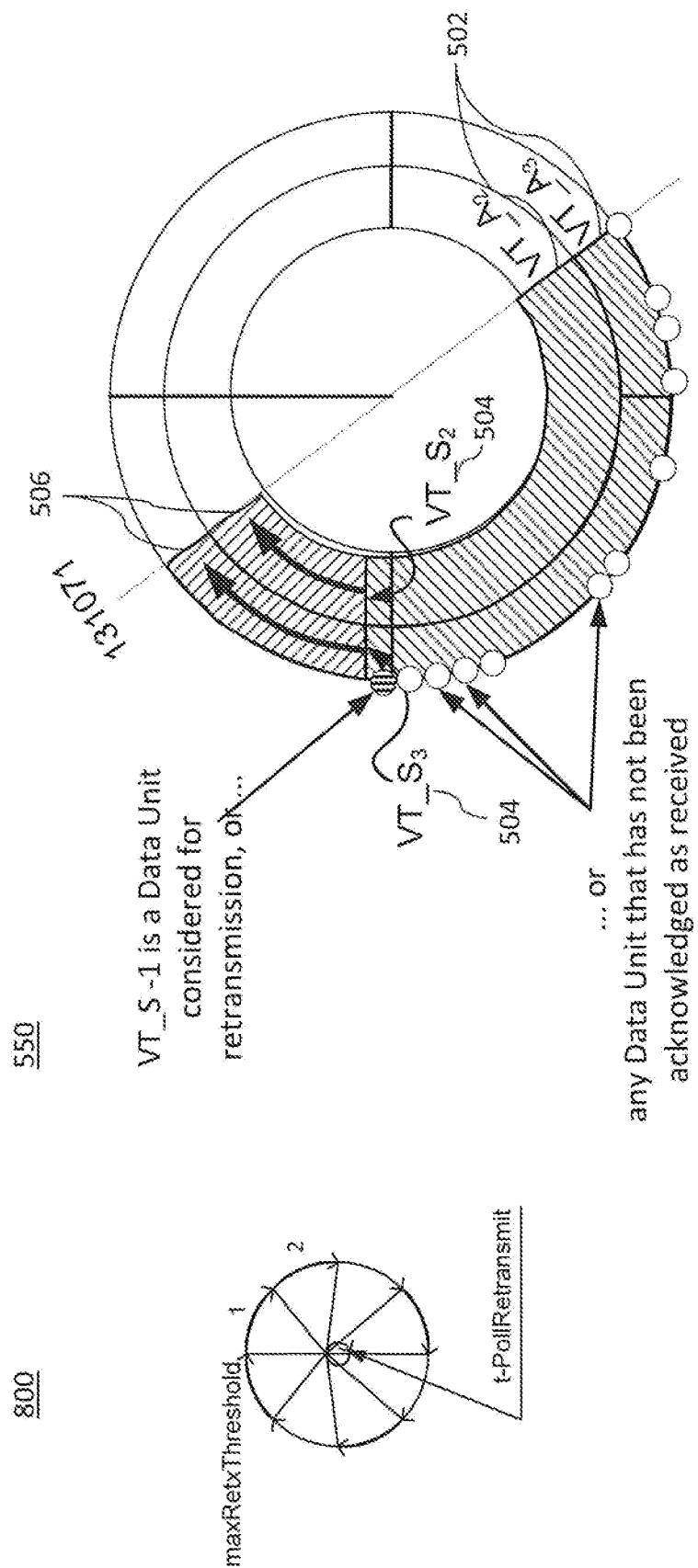
FIGS. 8 and 9 schematically illustrate data units used for transmitting a poll request.
Figure 9:
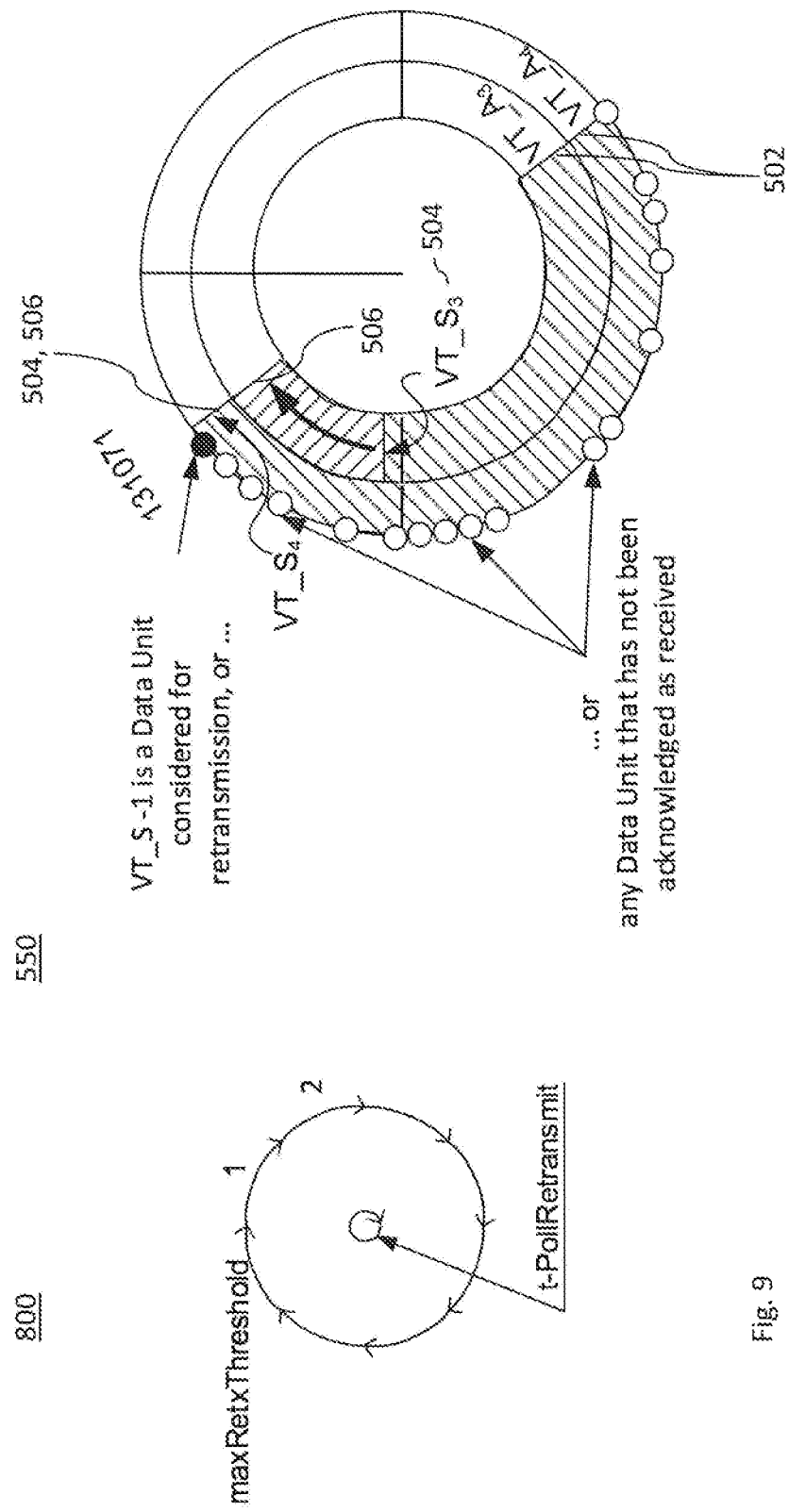

FIGS. 8 and 9 schematically illustrate how the state variables VT_S and VT_A are used to determine which DU shall be considered for the retransmission. In the example of FIG. 8, buffers are emptied and there is no new data to send. In the example of FIG. 9, due to an abundant amount of data to be transmitted, VT_S advanced all the way up to the upper edge 506 where window stalls.

As illustrated in each of the FIGS. 8 and 9, very many DUs may be in flight (i.e., unacknowledged) among the transmitted DUs which SNs are less than VT_S and equal to or greater than VT_A. In FIGS. 8 and 9, the SNs of unacknowledged DUs are indicated by white circles. For the other SNs that are less than VT_S and equal to or greater than VT_A, the device 100 has received status reports of acknowledged reception (e.g., responsive to a poll request).

The ReTx_count 800, which is maintained for each SN, is illustrated at reference sign 800 in FIGS. 8 and 9. As the ReTx_count 800 is incremented, the duration of the t-PollRetransmit timer sums up for each unsuccessful poll until maxReTx_Threshold is reached.

Although a NR RLC implementation of the device 100 may be allowed to deliver DUs out of order, reordering buffers of at least the NR PDCP layer will need to be dimensioned accordingly. E.g., 131070 data units (i.e., half of the SN space) at a Maximum Transmission Unit (MTU) size of 1500 Bytes require as much as 200 MB for each radio bearer, and each UE requires support for more than one such bearer.

Consequently, in conventional LTE, the metadata and related processing required for the ReTx_count scales with VT_S−VT_A. Therefore, the memory and processing equipment need be dimensioned for some worst-case order of 131070 DUs units that are missing and that need retransmission.

The timers according to the methods 300 and 400 enable the device 100 as the RLC transmitter and the device 200 as the RLC receiver to autonomously detect problems in the radio based on the time elapsed since VT_A and VT_R, respectively, stay missing.

Figure 10:
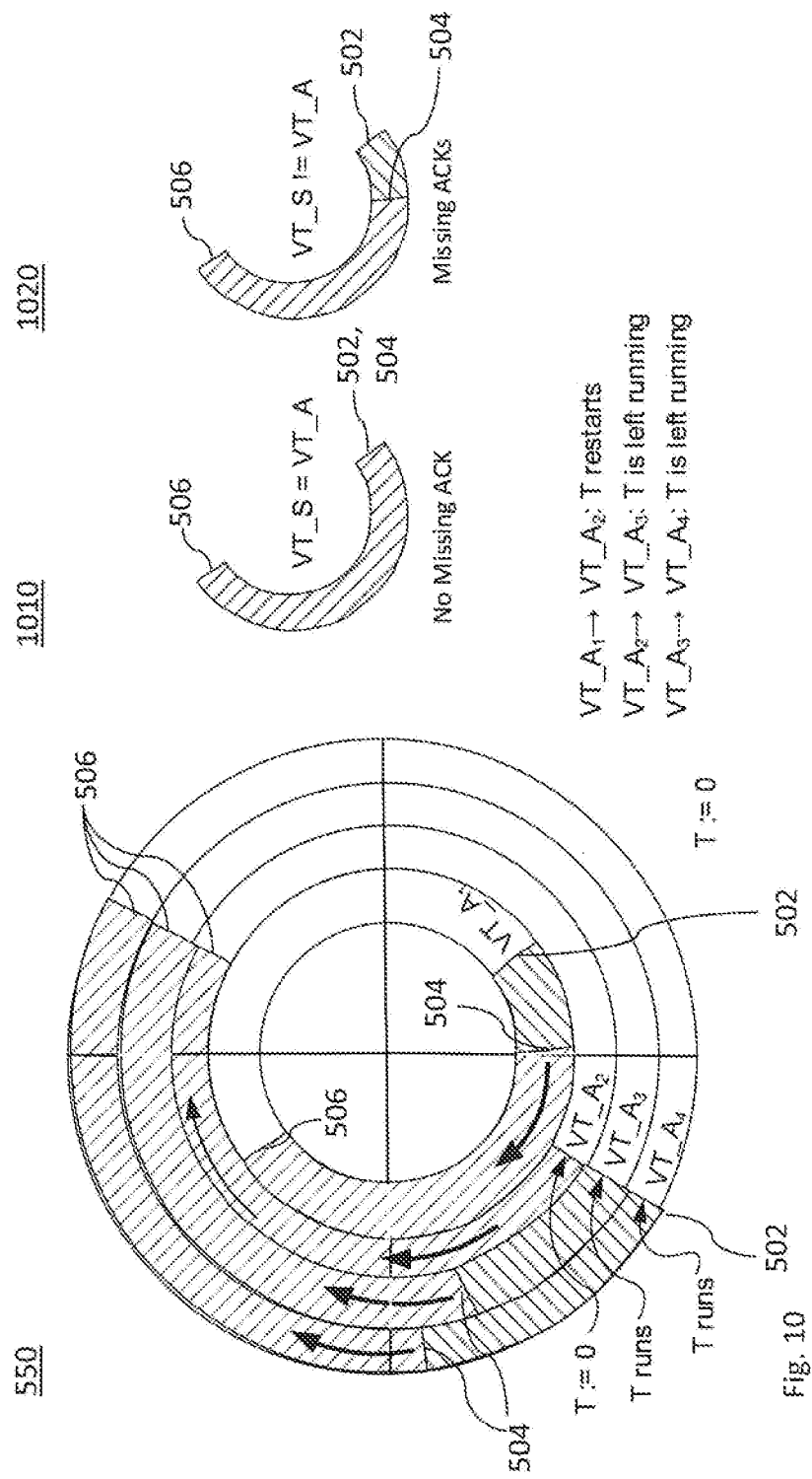
FIG. 10 schematically illustrates operation of a timer at a transmitting side, which is implementable at the device of FIG. 1.

FIG. 10 illustrates an operation of the timer T used according to the method 300 to supervise the progress of VT_A at the device 100 depending on the transmitting window 550. States of the receiving window without and with unacknowledged DUs are schematically illustrated at reference signs 1010 and 1020, respectively.

Thus, in NR RLC (or NR PDCP wherever ARQ is performed), when a DU is considered for retransmission and the lower end 502 of the transmitting window, VT_A, has moved forward, the timer T is set to zero. If the timer T equals or exceeds a threshold duration, e.g., T1 as the first duration (which may also be referred to as maxwaitB4RLF) or T2 as the second duration (which may also be referred to as maxwaitB4forward), an indication of bearer failure is delivered to upper layers according to the step 304.

Thus, the timer T measures the age of an unacknowledged DU with SN VT_A or the age of the transmitting window starting at SN VT_A.

In accordance with the method 300, the timer T may be operated according to several schemes. The following list of schemes is not exhaustive and any subcombination of the examples may be implemented by the method 300.

In a first example, the timer T, if not already running, is started when VT_S is updated and one or more unacknowledged DUs have been transmitted (i.e., VT_S !=VT_A). In a second example, if the timer T is already running, it is left running when VT_A is updated without getting a new value (i.e., VT_A is not changed), while unacknowledged transmitted data occurs (VT_S !=VT_A). In a third example, the timer T, if not already running, is started when the timer t-PollRetransmit is started, i.e. only when a poll bit for a DU is set for the first time (not in subsequent polling of the same SN). In a fourth example, if all transmitted data is acknowledged (i.e., VT_A equals VT_S), the timer T is stopped.

As one embodiment, the timer denoted as T1 is operated as described for the timer T. If the timer T1 expires (i.e., T1 equals or exceeds maxwaitB4RLF), the timer T1 triggers the RLF to be declared for the current radio bearer in the step 304.

As an extension of the one embodiment or in another embodiment, the timer denoted as T2 is operated as described for the timer T. If the timer T2 expires (i.e., T2 equals maxwaitB4forward), the timer T2 triggers a local indication within the device 100 or another layer of the transmitting station, to attempt to forward the one or more unacknowledged DUs (i.e., not successfully transferred DUs) over another RLC instance. This may also indicate that scheduling on the current RLC instance for which the timer T2 has expired may be paused, minimized or at least further decreased.

Alternatively, or in addition, expiry of the timer T2 triggers the device 100 as the RLC transmitter to stop or minimize the transmissions rate. Alternatively, or in addition, expiry of the timer T2 triggers an UE embodying the device 100 as the RLC transmitter to decrease the rate at which the UE is transmitting Scheduling Requests (SRs). Alternatively, or in addition, expiry of the timer T2 triggers an UE embodying the device 100 as the RLC transmitter to decrease the rate at which the UE is triggering Buffer Status Reports (BSRs). Alternatively, or in addition, expiry of the timer T2 triggers the device 100 as the RLC transmitter to advance the lower edge of the transmitting window, VT_A, and set it to VT_S. Alternatively, or in addition, expiry of the timer T2 triggers the device 100 as the RLC transmitter to advance the lower edge of the transmitting window, VT_A, to the next transmitted and unacknowledged DU (i.e., for which no successful RLC ACK has been received) following an acknowledged DU (i.e., for which successful ACK has been received), and then restart the timer T2.

The conventional RLF detection, e.g., solely based on counters, is also disadvantageous for the receiving side, e.g., a UE. If radio problems cause RLC PDUs transmitted by the RAN to the UE to not be successfully acknowledged, this means that after some time the RAN indicates the RLF, and as a result, attempts to release the UE. After some additional time period, the RAN indicates to higher layers that the UE should be released due to the radio problems, and this means that if the UE has not autonomously detected radio problems by itself within this time and attempted to access the RAN, the UE will be released from a core network of the RAN, e.g., by a Mobility Management Entity (MME) in an LTE implementation.

In contrast, the device 200, implemented at the receiving station (e.g., a UE), detects the decline (e.g., the RLF or any precursors thereof) autonomously. This enables the UE to perform a Radio Resource Control (RRC) reestablishment in a cell (e.g., in the current cell of the device 100 or another cell), which, if successful, means that the traffic interruption due to bad radio conditions is minimized, because the UE has not in this case been released by components of the core network.

The method 400 performed by the device 200 as the RLC receiver autonomously detects problems in the radio due to a gap detected in the receiving window according to the step 404.

If, as proposed in the previous embodiments, the device 100 as the RLC transmitter discards RLC PDUs and advances its transmitting window without notifying the RLC receiver, a conventional RLC receiver will get stuck waiting for the missing SN(s). To avoid such a deadlock in which the receiving window cannot be advanced, the method 400 detects the decline at the receiving side based on the timer.

In one embodiment of the device 200, the RLC receiver maintains the timer denoted by timer T3. The timer T3 is, if not running, started when a new hole or gap of outstanding DUs is detected in the receiving window. A hole or gap is present, if (e.g., and only if) there are one or more not completely received SNs that are less than VR_H. The timer T3 is stopped when VR_R is updated and there are no more holes or gaps below VR_H. If the timer T3 expires, the lower end of the receiving window (i.e., VR_R) is advanced to either VR_H or to the start of a next hole or gap. If such a next hole exists, the timer T3 is restarted. If no more holes exist, the lower end of the reception window, VR_R, is set to VR_H.

Figure 11:
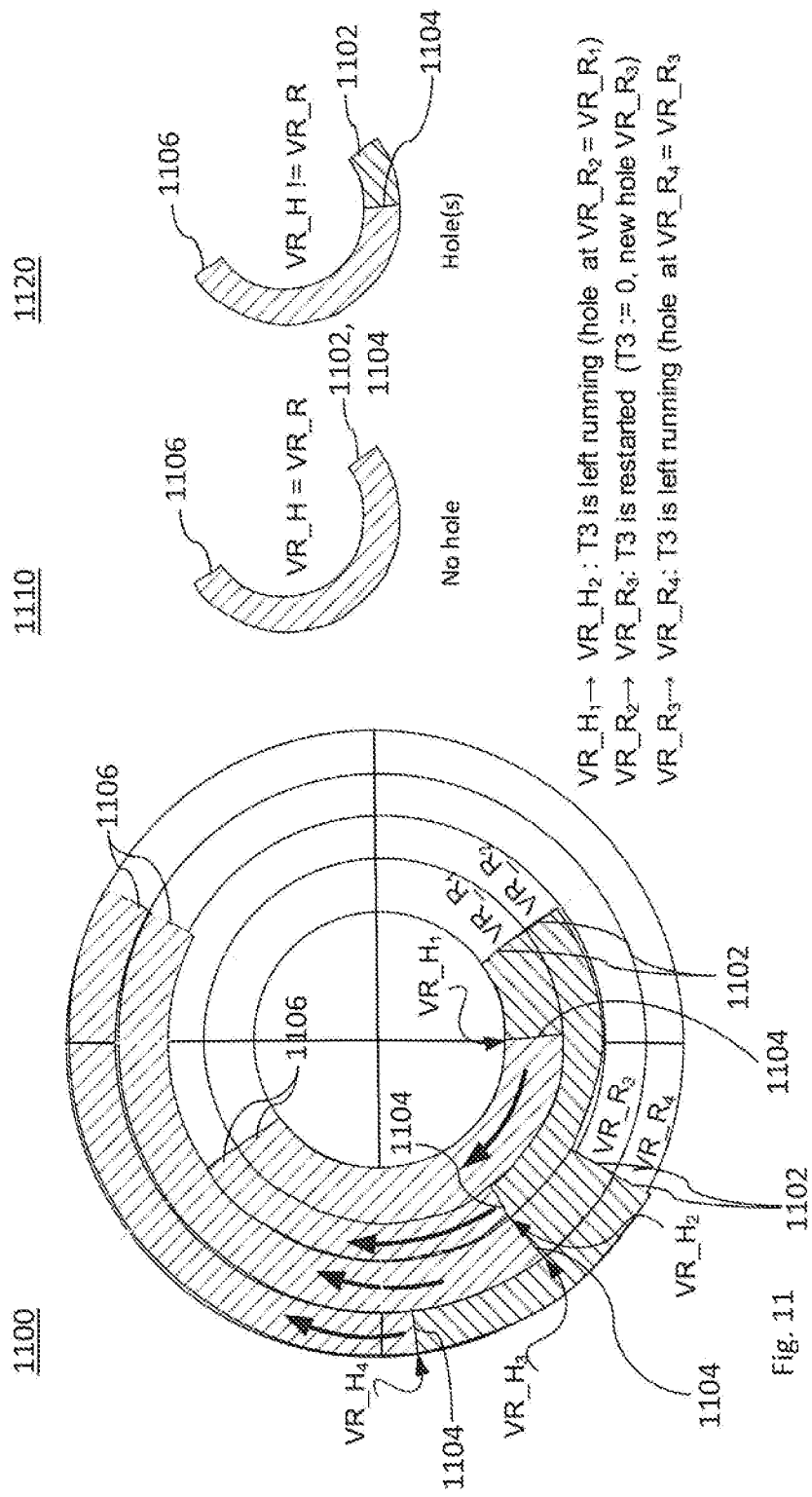
FIG. 11 schematically illustrates operation of a timer at a receiving side, which is implementable at the device of FIG. 2.

An example for operating the timer T3 according to the method 400 is schematically illustrated in FIG. 11 to control the maximum waiting time at the receiving side by means of the timer T3. Time advances in the radial direction outwards of the circular representation of the receiving window 1100. The third state variable VT_R, the fourth state variable VT_H and the upper edge of the receiving window are shown at reverence signs 1102, 1104 and 1106, respectively. States of the receiving window without and with holes (or gaps) of outstanding DUs to be received are schematically illustrated at reference signs 1110 and 1120, respectively.

In addition to the one embodiment or in another embodiment, when the timer T3 of the device 200 expires, the UE sends a new RLC status report, as if it would have been polled for the SN associated with the new value of VR_R, and all DUs received up to VR_R will thus be considered as acknowledged at the device 100. Alternatively, the UE does not trigger transmitting an RLC status report upon expiry of the timer T3.

If the device 200 advances its lower edge, VT_R, of the receiving window autonomously, the DUs with the SN in the (former) lower edge of the transmitting window (such as VT_A) may, if retransmitted later by the device 100, appear below the (advanced) lower edge of the receiving window and, thus, may continuously be discarded by the device 200 acting as the RLC receiver. To mitigate this problem, in one embodiment the device 200 triggers an RLC status report, if this happens, and transmits the RLC status reports as if it was polled with SN set to VR_R.

In addition to any embodiment of the device 200 or in a further embodiment, if the timer T3 expires and the device 200 as the RLC receiver is embodied by the RAN, the RAN, expiry of the timer T3 triggers an indication of bad radio at the receiver side. Alternatively, or in addition, the device 200 implemented at the RAN may stop or decrease the current rate of scheduling in the uplink responsive to the determination in the step 404.

As a still further embodiment or in addition to any of the above embodiments of the device 200, expiry of the timer T3 triggers the RLF at the RLC receiver.

Any implementation of the method 400 may allow the device 100 as the RLC transmitter to transmit new DUs that are received above the RLC receiving window. When the timer T2 of the device 100 expires, the RLC SN synchronization may be at risk if the device 100 as the RLC transmitter unilaterally advances its transmitting window. The next transmitted DU with VT_S (and DUs after that) may be appearing beyond the upper edge of the receiving window and, thus, may be discarded by a conventional RLC receiver.

The method 400 performed by the device 200 as the RLC receiver may detect this event and keep the synchronization with the device 100 as the RLC transmitter that advances its transmitting window at expiry of the timer T2. Therefore, any of the above embodiments of the device 200 may further reset both VR_R and VR_H to SN+1 when the device 200 receives a DU with an SN for which:

$$SN > VR\_R + AM\_Window\_Size; \text{ and}$$

$$SN < VR\_R + AM\_Window\_Size + \text{deltaSize},$$

wherein deltaSize is a value that is a substantial portion (e.g., a fraction) of the AM_Window_Size, e.g., a quarter (¼).

Alternatively, or in addition, any implementation of the methods 300 and 400 may synchronizing the device 100 as the RLC transmitter and the device 200 as the RLC receiver by means of signaling, e.g., control PDU messages.

Due to the varying load and radio conditions on the different legs, dual connectivity poses a special problem since data is sent over two paths and data sent over one leg may be significantly delayed compared to data sent on the other leg. This becomes especially problematic when the receiving PDCP entity (e.g., at the device 200 or the receiving station of the device 200) is unable to deliver PDCP SDUs in-order (i.e., in sequence) to higher layers leading to a window stall.

However, in dual connectivity, it can be assumed that at least one leg has a sufficiently good radio condition to ensure safe delivery of the one or more DUs. As an example, in a dual connectivity scenario, one leg may be using a lower LTE legacy carrier frequency while the other a 5G carrier frequency which may be in the order of magnitude 10 times higher. In such a scenario it can be assumed that the radio conditions on the 5G leg will exhibit severe shadow fading characteristics and consequently coverage can go from good to basically non-existent in short time (fast fading). In such a scenario it may be advantageous for the node terminating the PDCP protocol and where the leg flow control resides to resend the one or more DU already transmitted and residing in the 5G node to the LTE node. This will ensure that deliveries on PDCP level in the receiving entity in the UE are not stalled due to data stuck in the 5G node. In such a scenario, the transmitting PDCP entity receives an acknowledgement that the data stuck in the 5G leg has been successfully transmitted and received by the UE via the LTE leg making the data due for retransmissions on the 5G leg redundant. Consequently, the device 100 as the transmitting entity initiates a discard of the redundant one or more DUs and synchronization of RLC in the 5G node. This can be achieved by utilizing a dedicated control message. This control message could be sent over either the MAC, RLC or PDCP protocols and one possible embodiment is to utilize an RLC control PDU, e.g., as detailed below.

As an example, on RLC level, this can be accomplished by utilizing a reserved value of the Control PDU Type (CPT) field or alternatively by utilizing a reserved bit in the PDCP header. This currently reserved value could then be used to instruct the device 200 as the receiving entity to discard the one or more DUs on the leg that has low or no throughput. The indication could either be sent on the leg with the throughput problem or, more appropriately, on the other leg which radio conditions are better, instructing that one or more DUs of the other leg are to be discarded and RLC synchronized.

The control PDU could also be more explicit and instead of sending an instruction to discard all data, include an indication of which particular PDCP PDUs the receiving re-ordering entity in PDCP has requested via the good leg, so that the transmitting PDCP entity in turn can instruct which PDCP PDUs the RLC entity in the bad leg shall discard.

The CPT field in the 3GPP TS 36.322 RLC control PDU has a number of reserved bits (001-111), any of which may be used for the purpose of indicating this to the peer RLC entity. Alternatively, or in addition, any of the reserved bits in the 3GPP TS 36.323 PDCP headers may be used as well. The control PDU can then be used to instruct the receiving entity to discard all RLC SDU data up to a particular RLC SN and either explicitly via a polling bit or implicitly instruct the receiving RLC entity to send an acknowledgement via another control PDU utilizing another reserved header bit.

This ensures that the RLC entities on the leg experiencing transmission problems, based on the signaling coordination performed on the good leg, discards redundant data and synchronizes the RLC entities so that DU transmissions restart as soon as radio conditions allow.

The advantage of using explicit signaling as opposed to using a timer (or using solely the timer) is that signaling allows a more proactive handling so that throughput problems on one leg are addressed immediately without having to wait for any timer to expire. As an example, the node controlling the flow of data in a dual connectivity scenario may also have knowledge about the radio conditions or other changes such as congestion for both legs. Thus, the signaling allows forestalling any problem arising in the first place by being able to initiate a retransmission of data on the good leg and discard and synchronization of the other as needed without having to wait for any timer to expire.

Therefore, as a yet another related variant of any embodiment, the device 200 as the RLC receiver may use the above-mentioned control PDU or a message with similar capability to query or inform the device 100 as the peer RLC transmitter about any details of actions upon T3 expiry, which are relevant for the pair of devices 100 and 200 to maintain synchronization of the SNs and/or its windows. Such control PDU or message may be sent on the original (first) and/or the alternative (second) RLC leg.

Any of the above-described methods may also be reciprocal in that the device 100 may be embodied by the UE as the transmitter and the device 200 may be embodied by the RAN node as the receiving entity.

In yet another variant of any dual connectivity embodiment, the method 300 is implemented for controlling uplink leg transmissions of UEs. The RAN node (at which the PDCP layer and/or flow control is terminated or anchored) embodying the device 100 sends another RLC control message using yet another reserved bit that instructs the UE to send an acknowledgement and then pause transmissions, synchronize and discard data on the other leg.

In any of the above embodiments, the control PDUs may be sent just once, or more appropriately, the device 100 as the node transmitting the control message could continue to do so until receiving an acknowledgement control PDU in order to ensure a successful synchronization.

Moreover, in any embodiment of the device 100, the DU uses for polling the status report may be selected more efficiently. The device 100 as the transmitter selects the DU with SN VT_A when considering a DU for retransmission. This is not only advantages by the fact that, as evident from the above, the DU with VT_A plays a dominating role synchronizing the windows, but also since VT_A is the DU which is the most urgent one to transfer since it is the oldest of DUs in flight.

In an NR implementation, a poll request is transmitted and a timer t-PollRetransmit is started when either a threshold amount of bytes (e.g., pollByte) or DUs (e.g., pollPDU) is reached or if no new data can be transmitted (i.e., similar or equivalent to an LTE implementation). But, when the timer t-PollRetransmit expires, and if the timer T of the device 100 is running and there is (still) no new data to send (e.g. due to window stalling), the DU with SN=VT_A or any unacknowledged DU (i.e., which has not been positively acknowledged) is considered for retransmission. The poll request is transmitted and timer t-PollRetransmit is started again.

Figure 12:
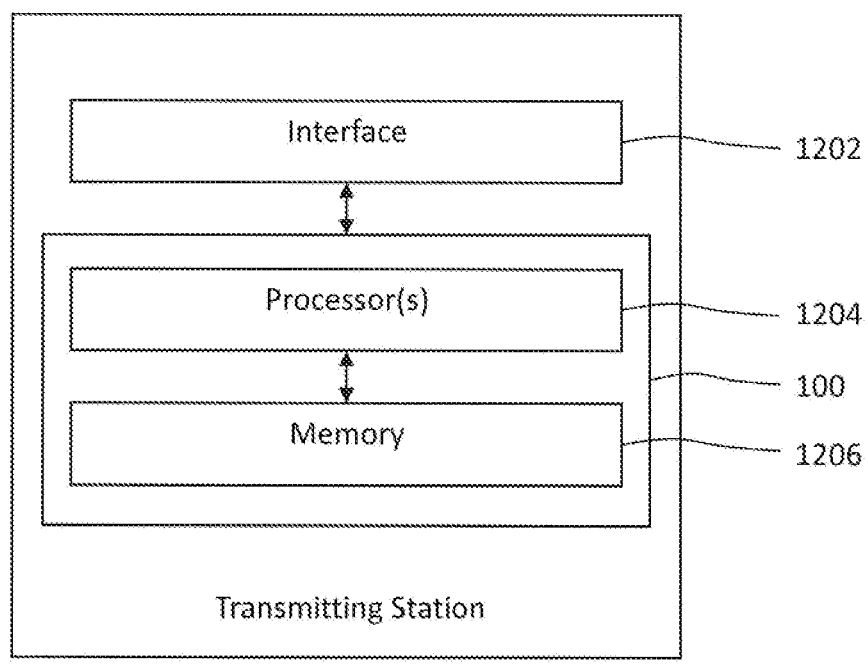
FIGS. 12 and 13 show schematic block diagrams for embodiments of the device of FIG. 1, which is deployable or virtualizable at a transmitting station.

FIG. 12 shows a schematic block diagram for an embodiment of the device 100. The device 100 comprises one or more processor(s) 1204 for performing the method 300 and memory 1206 coupled to the processor(s) 1204. For example, the memory 1206 may be encoded with instructions that implement at least one of the modules 102, 104 and 106.

The one or more processor(s) 1204 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1206, functionality of a transmitting station. For example, the one or more processor(s) 1204 may execute instructions stored in the memory 906. Such functionality may include providing various features and steps discussed herein, including any of the benefits disclosed herein. The expression "the device being operative to perform an action" may denote the device 100 being configured to perform the action.

As schematically illustrated in FIG. 12, the device 100 may be embodied by the transmitting station 1200. The transmitting station 1200 comprises a radio interface 1202 coupled to the device 100 for radio communication with one or more receiving stations.

Figure 13:
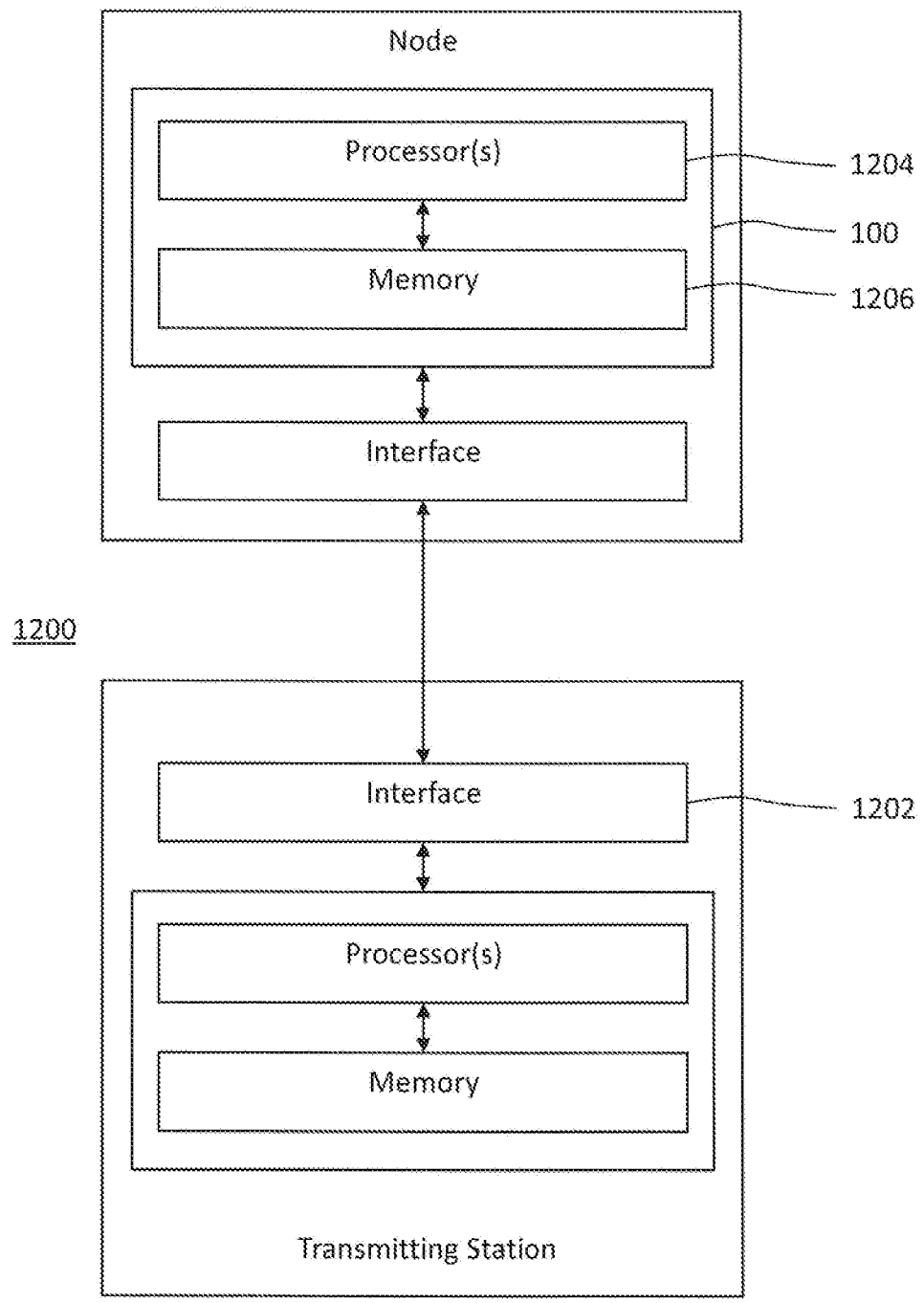

In a variant, e.g., as schematically illustrated in FIG. 13, the functionality of the device 100 is provided by a node of the radio network. That is, the node performs the method 300. The functionality of the device 100 is provided by the node to the transmitting station 1200, e.g., via the interface 1202 or a dedicated wired or wireless interface.

Figure 14:
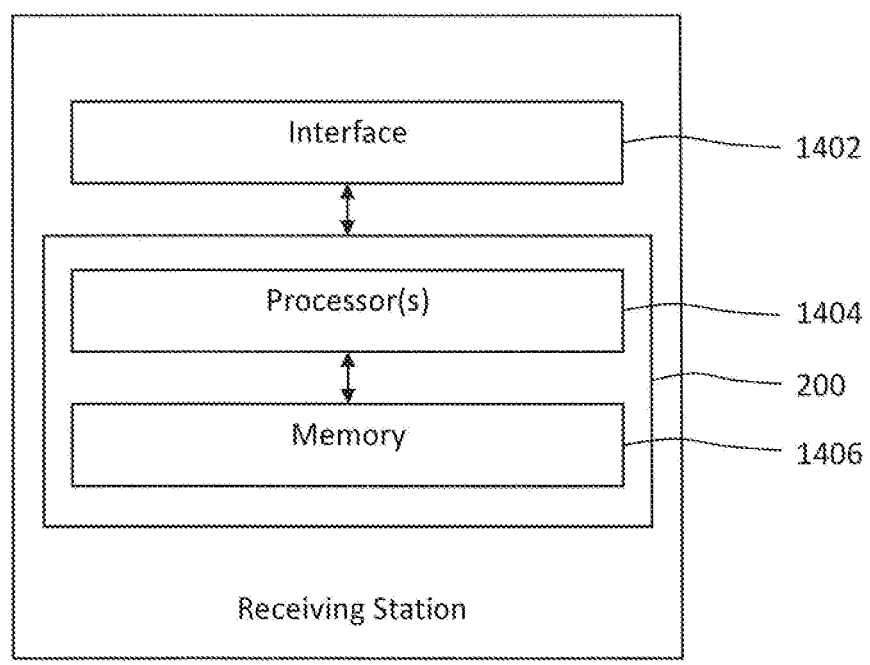
FIGS. 14 and 15 show a schematic block diagrams for embodiments of the device of FIG. 2, which is deployable or virtualizable at a transmitting station.

FIG. 14 shows a schematic block diagram for an embodiment of the device 200. The device 200 comprises one or more processor(s) 1404 for performing the method 400 and memory 1406 coupled to the processor(s) 1404. For example, the memory 1406 may be encoded with instructions that implement at least one of the modules 202, 204 and 206.

The one or more processor(s) 1404 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 200, such as the memory 1406, functionality of a receiving station. For example, the one or more processor(s) 1404 may execute instructions stored in the memory 1406. Such functionality may include providing various features and steps discussed herein, including any of the benefits disclosed herein. The expression "the device being operative to perform an action" may denote the device 200 being configured to perform the action.

As schematically illustrated in FIG. 14, the device 200 may be embodied by the receiving station 1400. The receiving station 1400 comprises a radio interface 1402 coupled to the device 200 for radio communication with a transmitting station.

Figure 15:
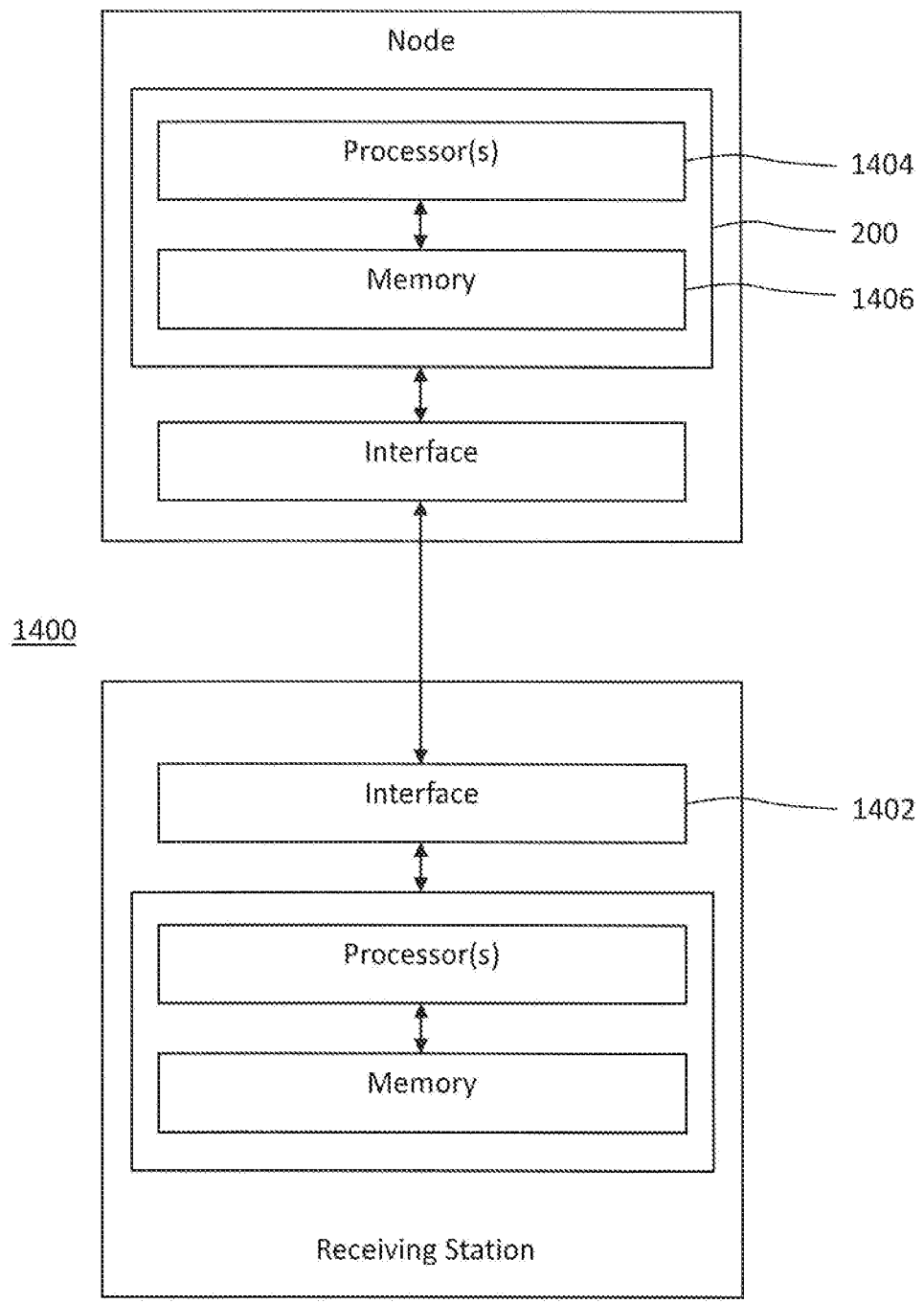

In a variant, e.g., as schematically illustrated in FIG. 15, the functionality of the device 200 is provided by a node of the radio network. That is, the node performs the method 400. The functionality of the device 200 is provided by the node to the receiving station 1400, e.g., via the interface 1402 or a dedicated wired or wireless interface.

As has become apparent from above description, embodiments of the technique are memory efficient by maintain only one or few timers per radio bearer, e.g., instead of keeping lengthy and costly track of a ReTx_count for each data unit that may be retransmitted. As a result, at least some of the embodiments require much less metadata for the RLC transmitter to track per RLC radio bearer and/or are simpler to implement and maintain.

Moreover, same of further embodiments achieve are more predictable timing behavior, e.g., in lower layers as seen from higher layers. Alternatively, or in addition, much less scheduling resources are needed to trigger RLF when the radio quality is very bad.

Some of the advantageous effects can translate to necessities as the rates and hence sequence number space grows, which is expected for 5G New Radio as compared to what is supported by legacy LTE.

In addition, the technique may be implemented at any RLC receiver to detect and trigger RLF. The receiver-triggered RLF is more efficient, e.g., in case a UE is the RLC receiver, because if the UE detects RLF it can trigger a re-establishment procedure to connect to a new cell, which will usually be more efficient than if the network would have to indicate RLF to higher network layers.

Same of still further embodiments can achieve two levels (or more levels) of indications for radio problems related to a radio bearer. A first level may be used to temporarily stop or minimize transmission on the radio bearer but not yet declare RLF. A second level may be used to declare RLF. The intermediate first level for indicating problems with the radio is useful, e.g., in a dual connectivity scenario for switching data transmission over to an alternative second RLC leg, and then clear the data in the first leg if it gets successfully transmitted on the second leg.

Particularly in the deployment of a 5G New Radio system when the dual connectivity is implemented by a PDCP layer distributing data units over two different RLC legs, the technique allows to set stronger limits for the time used for retransmissions, and to forward the DUs over the alternative other RLC leg. While in the conventional LTE, data units may not be discarded unless the ReTx_count reaches a fixed maximum number of times of retransmissions for triggering the RLF, for NR the dual connectivity is expected to be much more common, so that the technique can avoid frequent RLF triggers caused by a temporary bad radio condition on one of the RLC legs.

The intermediate first level may also be useful in single connectivity scenarios, e.g., to minimize the data traffic when there is a very bad radio condition.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

What is claimed is:

1. A method performed by a device that is configured to monitor a radio link control, RLC, communication path for transmitting data units, DUs, the method comprising:
   determining a decline of the RLC communication path based on a timer for one or more unacknowledged DUs transmitted on the RLC communication path; and
   upon receiving an acknowledgment for an oldest DU among the unacknowledged DUs transmitted on the RLC communication path, reinitiating the timer according to a time elapsed since transmitting a second-oldest DU among the transmitted and unacknowledged DUs.

2. The method of claim 1 wherein the timer is indicative of the time elapsed since the earliest transmission of the one or more unacknowledged DUs on the RLC communication path or the transmission of the oldest DU among the unacknowledged DUs transmitted on the RLC communication path.

3. The method of claim 1, further comprising maintaining the timer as long as the oldest DU among the unacknowledged DUs transmitted on the RLC communication path remains unacknowledged.

4. The method of claim 1 further comprising:
   transmitting a poll request for a status report using the oldest DU among the unacknowledged DUs transmitted on the RLC communication path; and
   receiving an acknowledgment or a negative acknowledgment for at least one of the transmitted DUs in the status report.

5. The method of claim 1, wherein the decline is determined upon elapse of at least one duration of the timer.

6. The method of claim 5, further comprising, upon elapse of the at least one duration of the timer:
   triggering a measure to restore transmission of the one or more DUs; or
   indicating the decline to a higher or lower layer of a communication protocol stack.

7. The method of claim 5, further comprising, upon elapse of a first duration of the timer, determining or indicating a radio link failure, RLF.

8. The method of claim 7 further comprising, upon elapse of a second duration of the timer:
   reducing or suspending the transmission of DUs on the RLC communication path;
   reducing a rate or suspending of transmitting scheduling requests or scheduling assignments;
   reducing a rate or suspending of transmitting buffer status reports;
   reducing a channel quality indicator for a physical channel used by the RLC communication path;

advancing the first state variable to equal the second state variable;

advancing the first state variable to the SN of the next unacknowledged DU following an acknowledged DU transmitted on the RLC communication path; or switching from the RLC communication path to another RLC communication path.

9. A method performed by a device that is configured to monitor a radio link control, RLC, communication path for receiving data units, DUs, the method comprising or triggering the step of:

determining a decline of the RLC communication path based on a timer for one or more outstanding DUs to be received on the RLC communication path, wherein each of the DUs to be received includes or is associated with a sequence number, SN, and wherein the SN of the one or more outstanding DUs is less than the SN of at least one DU received on the RLC communication path, upon receiving an acknowledgment for an oldest DU among the unacknowledged DUs transmitted on the RLC communication path, reinitiating the timer according to a time elapsed since noticing a second-oldest DU among the outstanding DUs.

10. The method of claim 9, wherein the timer is initiated upon receiving one or more DUs, whose SNs have a gap to DUs received in sequence on the RLC communication path.

11. The method of claim 9, further comprising maintaining a third state variable that is indicative of the SN following the highest SN of the DUs received in sequence on the RLC communication path.

12. The method of claim 9, further comprising, upon elapse of at least one third duration of the timer:

reducing a rate or suspending of transmitting scheduling grants;

reducing a channel quality indicator for a physical channel used by the RLC communication path;

advancing the third state variable to equal the fourth state variable;

advancing the third state variable to the SN of the next outstanding DU following a DU received on the RLC communication path; or switching from the RLC communication path to another RLC communication path.

13. A non-transitory computer readable medium storing executable program code that when executed by a computing device causes the computing device to perform:

determining a decline of the RLC communication path based on a timer for one or more outstanding DUs to be received on the RLC communication path, wherein each of the DUs to be received includes or is associated with a sequence number, SN, and wherein the SN of the one or more outstanding DUs is less than the SN of at least one DU received on the RLC communication path, upon receiving an acknowledgement for the oldest DU among the unacknowledged DUs transmitted on the RLC communication path, reinitiating the timer according to the time elapsed since noticing the second-oldest DU among the outstanding DUs.

14. A non-transitory computer readable medium storing executable program code that when executed by a computing device causes the computing device to perform:

determining a decline of the RLC communication path based on a timer for one or more unacknowledged DUs transmitted on the RLC communication path; and upon receiving an acknowledgement for the oldest DU among the unacknowledged DUs transmitted on the RLC communication path, reinitiating the time according to the time elapsed since transmitting the second-oldest DU among the transmitted and unacknowledged DUs.

15. A device for monitoring a radio link control, RLC, communication path for transmitting data units, DUs, the device comprising:

an interface circuitry for transmitting DUs to a receiving device over a communication network; and a processing circuitry configured to:

determine a decline of the RLC communication path based on a timer for one or more unacknowledged DUs transmitted on the RLC communication path, upon receiving an acknowledgment for an oldest DU among the unacknowledged DUs transmitted on the RLC communication path, reinitiate the timer according to a time elapsed since transmitting a second-oldest DU among the transmitted and unacknowledged DUs.

16. The device of claim 15 wherein the timer is indicative of the time elapsed since the earliest transmission of the one or more unacknowledged DUs on the RLC communication path or the transmission of the oldest DU among the unacknowledged DUs transmitted on the RLC communication path.

17. The device of claim 15, wherein the processing circuitry is further configured to maintain the timer as long as the oldest DU among the unacknowledged DUs transmitted on the RLC communication path remains unacknowledged.

18. The device of claim 15 wherein the processing circuitry is further configured to:

transmit a poll request for a status report using the oldest DU among the unacknowledged DUs transmitted on the RLC communication path; and receive an acknowledgment or a negative acknowledgment for at least one of the transmitted DUs in the status report.

19. The device of claim 15, wherein the wherein the processing circuitry is further configured to determine the decline upon elapse of at least one duration of the timer.

20. The device of claim 19, wherein the processing circuitry is further configured to, upon elapse of the at least one duration of the timer:

trigger a measure to restore transmission of the one or more DUs; or indicate the decline to a higher or lower layer of a communication protocol stack.

21. The device of claim 19, wherein the processing circuitry is further configured to, upon elapse of a first duration of the timer, determine or indicate a radio link failure, RLF.

22. The device of claim 21 wherein the processing circuitry is further configured to, upon elapse of a second duration of the timer:

reduce or suspending the transmission of DUs on the RLC communication path;

reduce a rate or suspending of transmitting scheduling requests or scheduling assignments;

reduce a rate or suspending of transmitting buffer status reports;

reduce a channel quality indicator for a physical channel used by the RLC communication path;

advance the first state variable to equal the second state variable;

advance the first state variable to the SN of the next unacknowledged DU following an acknowledged DU transmitted on the RLC communication path; or switch from the RLC communication path to another RLC communication path.

23. A device for monitoring a radio link control, RLC, communication path for receiving data units, DUs, the device comprising:

an interface circuitry for receiving DUs from a transmitting device over a communication network; and a processing circuitry configured to:

determine a decline of the RLC communication path based on a timer for one or more outstanding DUs to be received on the RLC communication path, wherein each of the DUs to be received includes or is associated with a sequence number, SN, and wherein the SN of the one or more outstanding DUs is less than the SN of at least one DU received on the RLC communication path;

upon receiving an acknowledgment for an oldest DU among the unacknowledged DUs transmitted on the RLC communication path, reinitiate the timer according to a time elapsed since noticing a second-oldest DU among the outstanding DUs.

24. The device of claim 23, wherein the processing circuitry is further configured to initiate the timer upon receiving one or more DUs, whose SNs have a gap to DUs received in sequence on the RLC communication path.

25. The device of claim 23, wherein the processing circuitry is further configured to maintain a third state variable that is indicative of the SN following the highest SN of the DUs received in sequence on the RLC communication path.

26. The device of claim 23, wherein the processing circuitry is further configured to, upon elapse of at least one third duration of the timer:

reduce a rate or suspending of transmitting scheduling grants;

reduce a channel quality indicator for a physical channel used by the RLC communication path;

advance the third state variable to equal the fourth state variable;

advance the third state variable to the SN of the next outstanding DU following a DU received on the RLC communication path; or switch from the RLC communication path to another RLC communication path.

* * * * *

UNITED STATES PATENT AND TRADEMARK OFFICE
CERTIFICATE OF CORRECTION

PATENT NO. : 11,039,328 B2  
APPLICATION NO. : 16/713581  
DATED : June 15, 2021  
INVENTOR(S) : Bergquist et al.

Page 1 of 1

It is certified that error appears in the above-identified patent and that said Letters Patent is hereby corrected as shown below:

In the Specification

In Column 1, Line 9, delete "2017," and insert -- 2017, now Pat. No. 10,531,321, --, therefor.

In Column 1, Line 26, delete "Acknowledge" and insert -- Acknowledged --, therefor.

In Column 9, Line 66, delete "W-Fi" and insert -- Wi-Fi --, therefor.

In Column 11, Line 26, delete "determine" and insert -- determining --, therefor.

In Column 13, Line 23, delete "W-Fi" and insert -- Wi-Fi --, therefor.

In Column 15, Line 9, delete "indicted" and insert -- indicated --, therefor.

In Column 15, Line 67, delete "$[VT_5 - VT_A]$" and insert -- $[VTs - VT_A]$ --, therefor.

In Column 16, Line 20, delete "sings" and insert -- signs --, therefor.

In Column 16, Line 65, delete "polIPDU)" and insert -- pollPDU) --, therefor.

In Column 17, Line 38, delete "need be" and insert -- need to be --, therefor.

In the Claims

In Column 26, Line 41, in Claim 19, delete "wherein the wherein the" and insert -- wherein the --, therefor.

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*